United States Patent [19]
Doktor

[11] Patent Number: 5,675,779
[45] Date of Patent: Oct. 7, 1997

[54] DATA PROCESSING SYSTEM AND METHOD FOR MAINTAINING CARDINALITY IN A RELATIONAL DATABASE

[75] Inventor: Karol Doktor, Victoria, Australia

[73] Assignee: Financial Systems Technology Pty. Ltd., South Melbourne Victoria, Australia

[21] Appl. No.: 439,207

[22] Filed: May 11, 1995

Related U.S. Application Data

[62] Division of Ser. No. 83,361, Jun. 28, 1993, abandoned, and a continuation of Ser. No. 526,424, May 21, 1990, abandoned.

[51] Int. Cl.$^6$ ............................................. G06F 17/30
[52] U.S. Cl. ............................................. 395/604; 395/603
[58] Field of Search .......................... 395/600, 611, 395/612, 613, 614, 615, 650, 700, 800, 601, 602, 603, 604, 605, 606, 607, 608, 609, 610, 616, 617, 618, 619, 620, 622

[56] References Cited

U.S. PATENT DOCUMENTS

| | | | |
|---|---|---|---|
| 3,618,027 | 11/1971 | Feng | 364/900 |
| 3,670,310 | 6/1972 | Bharwani et al. | 340/172.5 |
| 4,128,891 | 12/1978 | Lin et al. | 364/900 |
| 4,497,039 | 1/1985 | Kitakami et al. | 364/900 |
| 4,498,145 | 2/1985 | Baker et al. | 364/900 |
| 4,575,798 | 3/1986 | Lindstrom et al. | 364/300 |
| 4,631,664 | 12/1986 | Bachman | 364/200 |
| 4,670,848 | 6/1987 | Schramm | 364/513 |
| 4,791,561 | 12/1988 | Huber | 364/300 |
| 4,807,122 | 2/1989 | Baba | 364/200 |
| 4,829,427 | 5/1989 | Green | 364/300 |
| 4,893,232 | 1/1990 | Shimaoka et al. | 364/200 |
| 4,901,229 | 2/1990 | Tashiro et al. | 364/200 |
| 4,918,593 | 4/1990 | Huber | 364/200 |
| 4,930,071 | 5/1990 | Tou et al. | 364/300 |
| 4,930,072 | 5/1990 | Agrawal et al. | 364/300 |
| 4,933,848 | 6/1990 | Haderle et al. | 364/300 |
| 4,947,320 | 8/1990 | Crus et al. | 364/200 |
| 4,967,341 | 10/1990 | Yamamoto et al. | 364/200 |
| 5,133,068 | 7/1992 | Crus et al. | 395/600 |

(List continued on next page.)

OTHER PUBLICATIONS

Korth and Silberschatz, *Database System Concepts*, McGraw-Hill Book Company (New York, 1986), pp. 45–105, pp. 301–323.

"Extended Disjunctive Normal Form for Efficient Processing of Recursive Logic Queries", *IBM Technical Disclosure Bulletin*, vol. 30, No. 1, Jun. 1987, pp. 360–366.

Kifer et al., "SYGRAF: Implementing Logic Programs in a Database Style", *IEEE Transactions on Software Engineering*, vol. 14, No. 7, Jul., 1988, pp. 922–935.

Yu et al., "Automatic Knowledge Acquisition and Maintenance for Semantic Query Optimization", *IEEE Transactions on Knowledge and Data Engineering*, vol. 1, No. 3, Sep. 1989, pp. 362–375.

El-Sharkawi et al., "The Architecture and Implementation of ENLI: An Example-Based Natural Language-Assisted Interface", *PARBASE–90 International Conference on Databases, Parallel Architectures and Their Applications*, 7–9 Mar. 1990, pp. 430–342.

Wilschut et al., "Pipelining in Query Execution", *PARBASE–90 International Conference on Databases, Parallel Architectures and Their Applications*, 7–9 Mar. 1990, p. 562.

*Primary Examiner*—Thomas G. Black
*Assistant Examiner*—Ruay Lian Ho
*Attorney, Agent, or Firm*—Skjerven, Morrill, MacPherson, Franklin & Friel; Edward C. Kwok

[57] ABSTRACT

A relationships processing computing system provides for the recording and extraction of data objects (entities) and for development data representing a queried relationship between data objects (entities). The set of entities and relationships may be expanded at any time during the life of the system without reprogramming or compiling computer code and without disrupting concurrent use of the system. Complex inquiries, normally requiring multiple nested queries, may be performed without code level programming.

6 Claims, 19 Drawing Sheets

U.S. PATENT DOCUMENTS

| | | | |
|---|---|---|---|
| 5,168,565 | 12/1992 | Morith | 395/600 |
| 5,226,158 | 7/1993 | Horn et al. | 395/600 |
| 5,239,663 | 8/1993 | Faudemay et al. | 395/800 |
| 5,379,419 | 1/1995 | Heffnam et al. | 395/600 |
| 5,386,557 | 1/1995 | Boykin et al. | 395/600 |
| 5,386,559 | 1/1995 | Eisenberg et al. | 395/600 |
| 5,408,657 | 4/1995 | Bigelow et al. | 395/600 |
| 5,488,722 | 1/1996 | Potok | 395/600 |
| 5,504,885 | 4/1996 | Alashour | 395/600 |
| 5,542,073 | 7/1996 | Schiefer et al. | 395/600 |
| 5,548,749 | 8/1996 | Kroenke et al. | 395/600 |

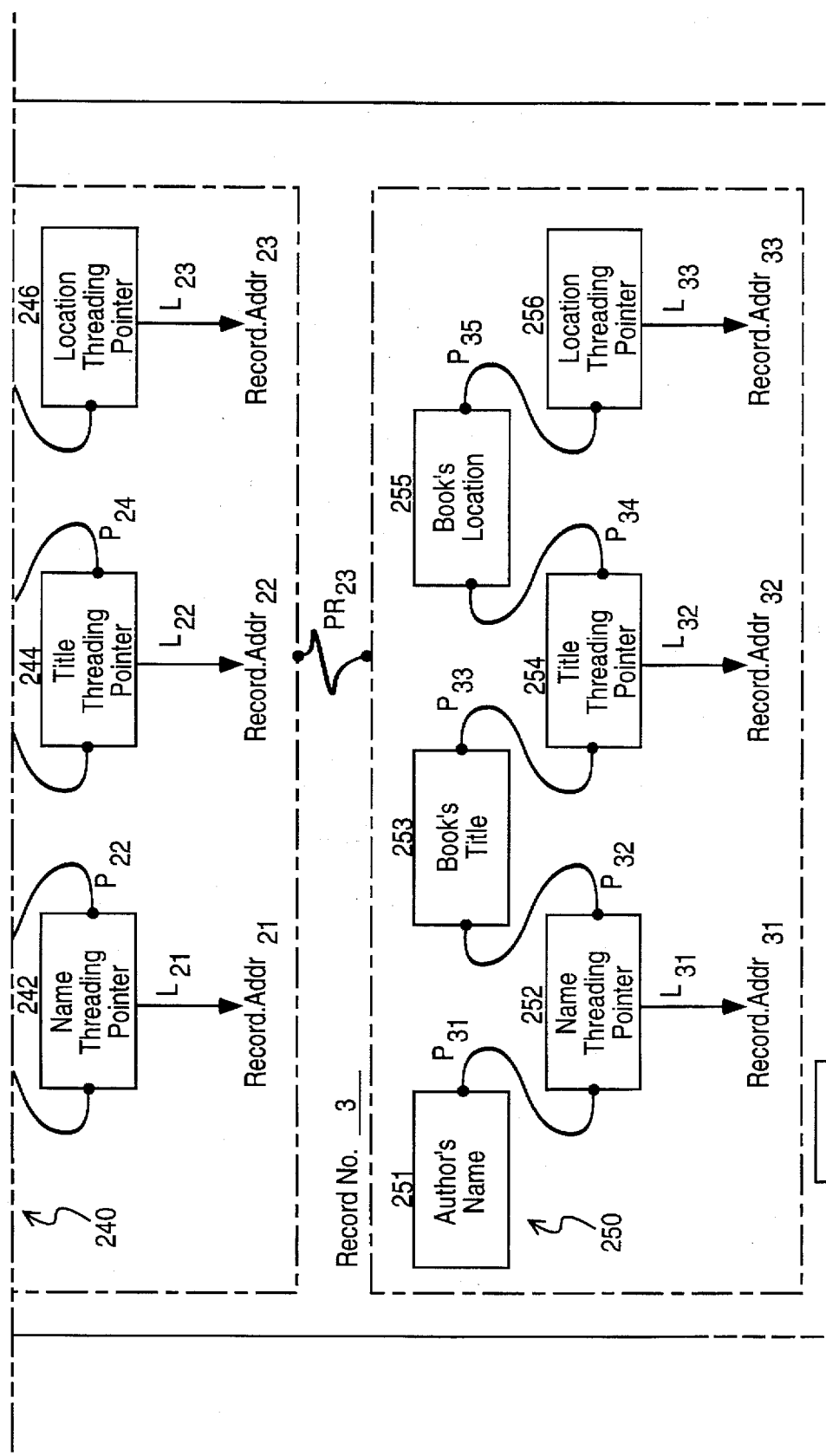
FIG. 2A-2 (Prior Art)
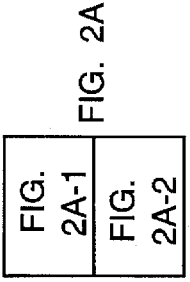

400

450

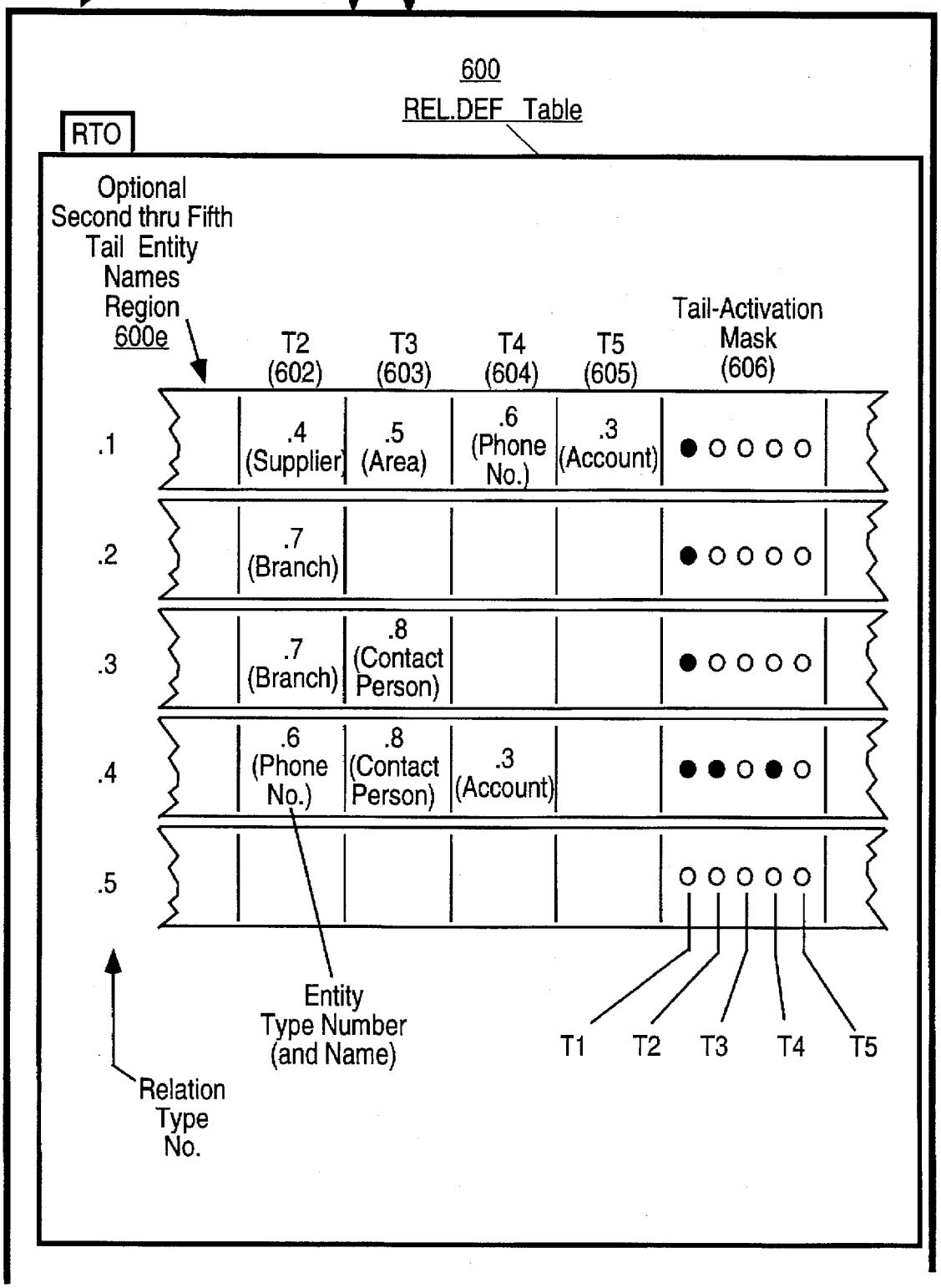

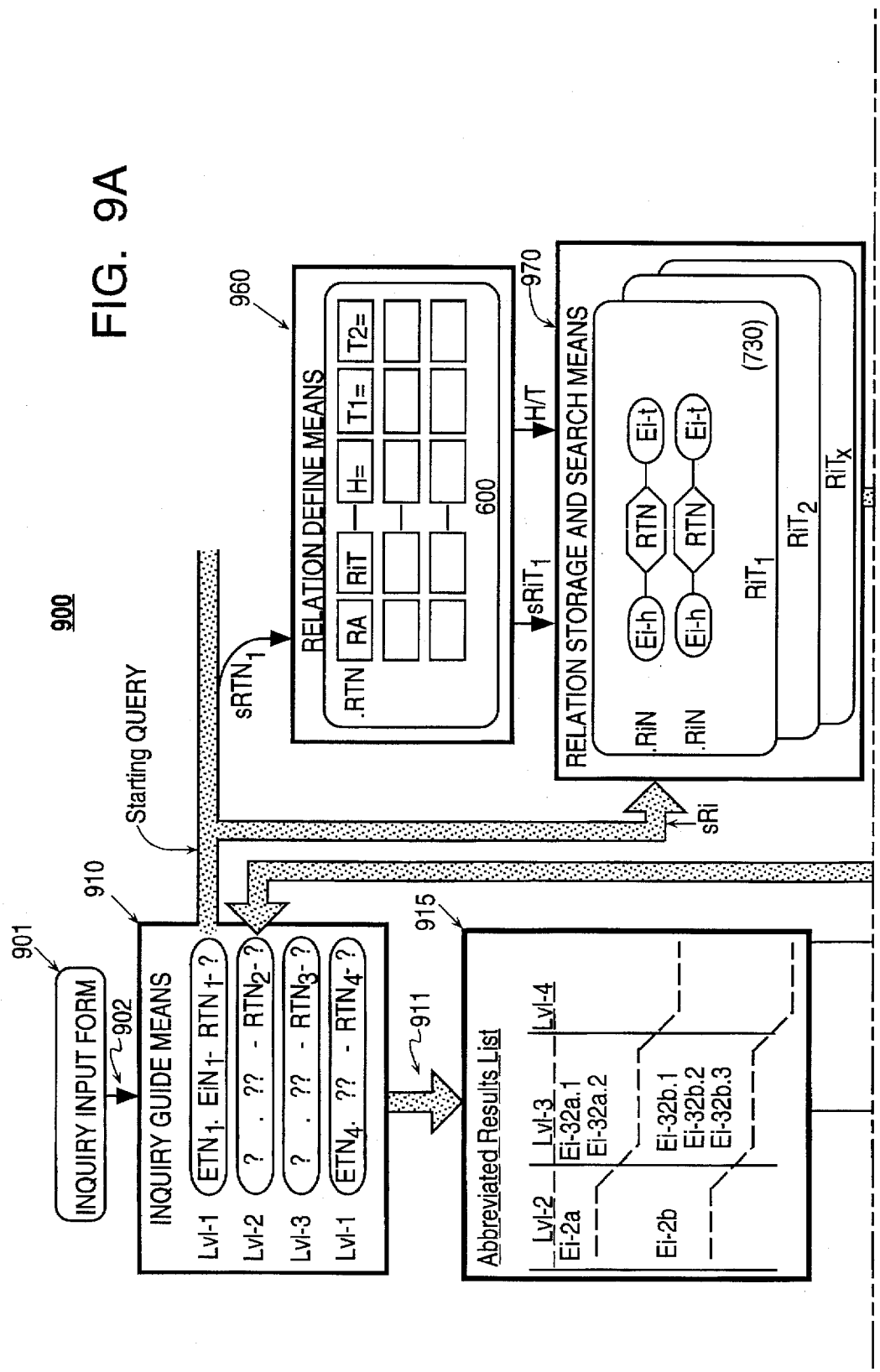

| FIG. 9A |
| FIG. 9B |

DATA PROCESSING SYSTEM AND METHOD FOR MAINTAINING CARDINALITY IN A RELATIONAL DATABASE

This application is a division of application Ser. No. 08/083,361, filed Jun. 28, 1993, now abandoned, and a continuation of Ser. No. 07/526,424, filed May 21, 1990, now abandoned.

BACKGROUND OF THE INVENTION

1. Cross Reference to Microfiche Appendix

This application includes a plurality of computer program listings (modules) in the form of a Microfiche Appendix which is being filed concurrently herewith as 1162 frames (not counting target and title frames) distributed over 20 sheets of microfiche in accordance with 37 C.F.R. § 1.96. The disclosed computer program listings are incorporated into this specification by reference but it should be noted that the source code and/or the resultant object code of the disclosed program modules are subject to copyright protection. The copyright owner has no objection to the facsimile reproduction by anyone of the patent document (or the patent disclosure as it appears in the files or records of the U.S. Patent and Trademark Office) for the sole purpose of studying the disclosure but otherwise reserves all other rights to the disclosed computer program modules including the right to reproduce said computer program modules in machine-executable form.

2. Field of Invention

The present invention relates generally to computer database management systems and more specifically to apparatus and methods for modifying and searching through large scale databases at high speed.

3. Description of Related Art

Modern computer systems are capable of storing voluminous amounts of information in bulk storage means such as magnetic disk banks. The volume of stored information can be many times that of the textual information stored in a conventional encyclopedia or in the telephone directory of a large city. Moreover, modern computer systems can sift through the contents of their bulk storage means at extremely high speed, accessing as many as one million bytes of information or more per second (a byte is a string of eight bits, equivalent to approximately one character of text in layman's terms). Despite this capability, it may take an undesirably long time (i.e., hours or days) to retrieve desired pieces of information. In commercial settings such as financial data storage facilities, there will be literally, billions of pieces of information that could be sifted through before the right one or more pieces of information are found. Thus, even at speeds of one million examinations per second, it can take thousands of seconds (many hours) to retrieve a desired piece of information. Efficient organization of the stored information is needed in order to minimize retrieval time.

The methods by which pieces of information are organized within a computer, searched through or reorganized, often parallel techniques used by older types of manual information processing systems. A well known example of a manual system is the index card catalog found in public libraries. Such a card catalog consists of a large number of uniformly dimensioned paper cards which are serially stacked in one or more trays. The cards are physically positioned such that each card is directly adjacent to no more than two others (for each typical examination there is a preceding card, the card under examination and a following card in the stack). On the front surface of each index card a librarian enters, in left to right sequence; the last name of an author, the first name of the author, the title of a single book which the author wrote and a shelf number indicating the physical location within the library where the one book may be found. Each of these four entries may be referred to as a "column" entry. Sufficient surface area must be available on each card to contain the largest of conceivable entries.

After the entries are made, the index cards are stacked one after the next in alphabetical order, according to the author's last name and then according to the author's first name and then by title. This defines a "key-sequenced" type of database whose primary sort key is the author's name. The examination position of each card is defined relative to the contents of preceding and following cards in the stack. That is, when cards are examined, each intermediate card is examined immediately after its alphabetically preceding card and immediately before its alphabetically succeeding card. When a new book is acquired, the key-sequenced database is easily "updated" by inserting a new card between two previously created cards. Similarly, if a book is removed from the collection, its card is simply pulled from the card stack to reflect the change.

If a library user has an inquiry respecting the location of a particular book or the titles of several books written by a named author, the librarian may quickly search through the alphabetically ordered set of index cards and retrieve the requested information. However, if a library user has an inquiry which is not keyed to an author's name, the search and retrieval process can require substantially more time; the worst case scenario being that for each inquiry the librarian has to physically sift through and examine each card in the entire catalog. As an example of such a scenario, suppose that an inquiring reader asks for all books in the library where the author's first name is John and the title of the book contains the word "neighbor" or a synonym thereof. Although it is conceptually possible to answer this inquiry using the information within the catalog, the time for such a search may be impractically long, and hence, while the information is theoretically available, it is not realistically accessible.

To handle the more common types of inquiries, libraries often keep redundant sets of index cards. One set of cards is sorted according to author names and another set is sorted according to the subject matter of each book. This form of redundant storage is disadvantageous because the size of the card catalog is doubled and hence, the cost of information storage is doubled. Also, because two index cards must be generated for each new book added to the collection the cost of updating the catalog is also doubled.

The size of a library collection tends to grow over time as more and more books are acquired. During the same time, more and more index cards are added to the catalog. The resulting stack of cards, which may be viewed as a kind of "database", therefore grows both in size and in worth. The "worth" of the card-based system may be defined in part as the accumulated cost of all work that is expended in creating each new index card and in inserting the card into an appropriate spot in the stack.

As time goes by, not only does the worth and size of the database grow, but new technologies, new rules, new services, etc., begin to emerge and the information requirements placed on the system change. Some of these changes may call for a radical reorganization of the card catalog system. In such cases, a great deal of work previously expended to create the catalog system may have to be discarded and replaced with new work.

For the sake of example, let it be supposed that the library acquires a new microfilm machine which stores copies of a large number of autobiographies. The autobiographies discuss the life and literary works of many authors whose books are kept in the library. Let it further be supposed that the original, first card catalog system is now required to cross reference each book to the microfilm location (or plural locations) of its author's (or plural authors') autobiographies. In such a case, the card catalog system needs to be modified by adding at least one additional column of information to each index card to indicate the microfilm storage locations of the relevant one or more autobiographies.

We will assume here that there is not enough surface area available on the current index cards for adding the new information. Larger cards are therefore purchased, the information from the old cards is copied to the new cards, and finally, the new microfilm cross referencing information is added to the larger cards. This type of activity will be referred to here as "restructuring" the database.

Now let us suppose, that as more time goes by, an additional but previously unanticipated, cross indexing category is required because of the introduction of a newer technology or a new government regulation. It might be that the just revised and enlarged second card system does not have the capacity to handle the demands of the newer technology or regulation. In such a situation, a third card system has to be constructed from scratch. The value of work put into the creation of the just-revised second system is lost. As more time passes and further changes emerge in technology, regulations, etc., it is possible that more major organizational changes will have to be made to the catalog system. Time after time, a system will be built up only to be later scrapped because it fails to anticipate a new type of information storage and retrieval operation. This is quite wasteful.

Although computerized database systems are in many ways different from manual systems, the computerized information storage and retrieval systems of the prior art are analogous to manual systems in that the computerized databases require similar restructuring every time a new category of information relationships or a new type of inquiry is created.

At a fundamental level, separate pieces of information are stored within a computerized database system as a large number of relatively short strings of binary bits where each string has finite length. The bit strings are distributed spacially within a tangible medium of data storage such as an array of magnetic disks, optical devices or other information representing means capable of providing mass storage. Each bit is represented by a magnetic flux reversal, an optical perturbation and/or some other variance in the physical attributes of a data storage medium. A transducer or amplifier means converts these variances into signals (e.g., electrical, magnetic, or optical) which can be processed on a digital data processing machine. Each string of bits is often uniquely identified by its physical location or by a logical storage address. Some bit strings may function as address pointers, rather than as the final pieces of "real" information which a database user wishes to obtain. The address pointers are used to create so-called "threaded list" organizations of data wherein logical links between a first informational "object" (first piece of real data) and a second informational "object" (second piece of real data) are established by a chain of direct or indirect address pointers. The user-desired objects of real information themselves can be represented by a collection of one or more physically or logically connected strings.

Typically, "tables" of information are created within the mass storage means of the computerized system. A horizontal "row" of related objects, which is analogous to a single card in a card catalog system, may be defined by placing the corresponding bit strings of the objects in physical or address proximity with each other. Logical interconnections may be defined between different rows by using ancillary pointers (which are not considered here as the "real" data sought by a database user). A serial sequence of "rows" (analogous to a stack of cards) is then defined by linking one row to another according to a predefined sorting algorithm using threaded list techniques.

A vast number of different linking "threads" may be defined in this way through a database table having millions or billions of binary information bits. Unlike manual systems, the same collection of rows (which replaces the manual stack of cards) can be simultaneously ordered in many different ways by utilizing a multiplicity of threaded paths so that redundant data storage is not necessary. Searches and updates may be performed by following a prespecified thread from one row to the next until a sought piece of information (or its address) is found within a table. A threaded-list type of table can be "updated" in a manner similar to manual card systems by breaking open a logical thread within the list, at a desired point, and inserting a new row (card) or removing an obsolete row at the opened spot.

Tables are often constructed according to a "key-sequenced" approach. One column of a threaded-list table is designated as the sort-key column and the entries in that column are designated as "sort keys". Address pointers are used to link one row of the table to another row according to a predefined sequencing algorithm which orders the entries (sort-keys) of the sort column as desired (i.e., alphabetically, numerically or otherwise). Once a table is so sorted according to the entries of its sort column, it becomes a simple task to search down the sort column looking for an alphabetically, numerically or otherwise ordered piece of data. Other pieces of data which are located within the row of each sort key can then be examined in the same sequence that each sort key is examined. Any column can serve as the sort column and its entries as the sort keys. Thus a table having a large plurality of columns can be sorted according to a large number of sorting algorithms.

The key-sequencing method gives tremendous flexibility to a computerized database but not without a price. Each access to the memory location of a list-threading address pointer or to the memory location of a sort-key or to the memory area of "real" data which is located adjacent to a sort-key takes time. As more and more accesses are required to fetch pointers and keys leading to the memory location of a piece of sought-after information ("real data"), the response time to an inquiry increases and system performance suffers.

There is certain class of computerized databases which are referred to as "relational databases". Such database systems normally use threaded list techniques to define a plurality of key-sequenced "tables". Each table contains at least two columns. One column serves as the sort column while a second or further columns of the table store either the real data that is being sought or additional sort-key data which will ultimately lead to a sought-after piece of real data. The rows of the table are examined in an ordered fashion according to the contents of the sort column. Target data is located by first threading down the sort column and thus moving through the chain of rows within a table according to a prespecified sort algorithm until a specific sort-key is found. Then the corresponding row is examined horizontally and the target data (real data, or the next key) is extracted from that row.

An example of "real" data would be the full-legal names of unique persons such as in the character strings, "Mr. Harry W. Jones", "Mrs. Barbara R. Smith", etc. The sort-key can be a number which is stored adjacent to the full name and which sequences the names (real data) according to any of a wide variety of ordering patterns including by age, by height, by residential address, alphabetically, etc. Because the real data (e.g., full name of a person) is stored in a separate column, it is independent from the sort key data. A large variety of different relations can therefore be established between a first piece of real data (e.g., a first person's name) and a second piece of real data (e.g., a second person's name) simply by changing the sort keys that are stored in the separate sort column (e.g., who is older than whom, who is taller, etc.). Plural orderings of the real data can be obtained at one time by providing many columns in one table, by storing alternate keys in the columns and by choosing one or more of these columns as the primary sort key column.

Relational database systems often include tables that do not store real data in a column adjacent to their sort-key column, but rather store a secondary key number which directs a searcher to a row in another key-sequenced table where a matching key number is held together with either a piece of sought-after real data or yet another forward referencing key number (e.g., an entry which in effect says "find the row which holds key number x of yet another table for further details"). With this indirect key-sequenced approach, a large number of tables can be simultaneously updated by changing one entry in a "base" table.

Relational database tables are normally organized to create implied set and subset "relations" between their respective items of pre-stored information. The elements of the lowest level subsets are stored in base tables and higher level sets are built by defining, in other tables, combinations of keys which point to the base tables. The implied relations between elements cannot be discerned by simply inspecting the raw data of each table. Instead, relations are flushed out only with the aid of an access control program which determines in its randomly-distributed object code, which table to examine first and what column to look at before beginning to search down the table's column for a key number and, when that key number is found, what other column to look at for the real data or a next key number. Relations between various "entities" of a relational database are implied by the sequence in which the computer accesses them.

By way of a concrete example, consider a first relational table (Names-Table) which lists the names of a large number of people in telephone directory style. Each name (each separate item of real data) is paired to a unique key number and the rows of this Names-Table are sorted sequentially according to the key number. A second relational table may be provided in-the database (Cars-Table) which lists automobile (vehicle) identification numbers (VIN) each paired in its row with a second key number. If the second key number is matched by a corresponding key number in the first table, then a relationship might be implied between the entries of the two separate tables (Names-Table and Cars-Table). The "implied" relationship might be one of an infinite set of possibilities. The relationship could be, for example, that the car listed in the second table is "owned" by the person whose name is found next to a matching key in the first table. On the other hand, it might be implied that the matched person in the first table "drives" the car, or "cleans" the car or has some other relation to the car. It is left to the access control program to define what the relationship is between entities in the first table and entities in the second table.

It can be seen that relational database systems offer users a great deal of flexibility since an infinite number of relations may be defined (implied). Economy in maintaining (updating) the database is also provided since a change to a base table propagates through all other tables which reference the base table. The access control program of the database system can include information-updating modules which, for example, change the key number in the second table (Cars-Table) whenever ownership of a car changes. If the name of the new owner is already in the first table (Names-Table), it does not have to be typed a second time into a new storage area and thus, extra work and storage redundancy are avoided. The vehicle identification number (VIN) remains unchanged. Minimal work is thus expended on updating the database.

Despite these advantages, relational database systems suffer from expandability and restructuring problems similar to those of the above-described manual system. Sometimes the rows within a particular table have to be altered to add additional columns. This is not easily done. Suppose for example, that a new government regulation came into being, mandating that vehicles are to always be identified not only by a vehicle identification number (VIN) but also by the name and location of the factory where the vehicle was assembled. If spare columns are not available in the Cars-Table, the entire database may have to be restructured to create extra room in the storage means (i.e. the disk bank) for adding the newly required columns. New key numbers will have to be entered into the new columns of each row (e.g., a new "factory of assembly" key number) and sorted in order to comply with the newly mandated regulation. New search and inquiry routines will have to be written for handling the newly structured tables.

In the past, much of this restructuring work was done by reprogramming the computer at the object code or source code level. This process relied heavily on an expert programming staff. It was time consuming, costly and prone to programming errors. Worst of all, it had to be redone time and again as new informational requirements emerged just after a last restructuring project was completed. There is a need in the industry for a database management system which provides quick responses to inquiries and which can also be continuously updated or restructured without reprogramming at the source or object code level.

SUMMARY OF THE INVENTION

It is an objective of the present invention to provide a database system which is capable of storing voluminous amounts of information, sifting through the information at high speed, and is at the same time easily expandable or restructurable to take on new forms of entities and relationships.

In accordance with a first aspect of the invention, an entity definition table (ENT.DEF) is defined within the memory means of a computer system to store the name of an allowed entity type (class) and the name of a single other table (Entity-instances Table or "EiT" for short) where instances of the allowed entity type may be stored. A separate relationships definition table (REL.DEF) is defined in the memory means to list in each row of the table: (a) the name of an allowed relations type, (b) the name of a single Relation-instances Table (RiT) where instances of the allowed relationship type may be stored, (c) the name of a primary (head) entity type to which the relation type may apply and (d) the names of one or more secondary (tail) entity types to which the named relationship may apply. Each row of the Relation-instances Table (RiT) is provided with at least one primary pointer which points to the storage location of a first instance of the primary entity type and at least one secondary pointer which points to the storage location of a corresponding first instance of the secondary entity type. Each row of the Relation-instances Table (RiT) further includes a pointer to a relationship-defining row in the REL.DEF table. The pointer can be the name of an applicable relation type as recorded in the REL.DEF table. Relationships between instances of a primary entity and a secondary entity are thus expressly defined by entries in the Relation-instances Table (RiT). Adding new rows to this Relation-instances Table (RiT) allows for the addition of new relations. Adding new rows to the REL.DEF table allows for the creation of new classes (types) of relationships. Since relation-defining tables can be updated using a fixed set of update modules, reprogramming at the source or assembly level is not needed for restructuring the schema of the database.

BRIEF DESCRIPTION OF THE DRAWINGS

The invention will be described with reference to the following figures in which:

FIGS. 6A and 6B are block diagrams of a relationship definition (REL.DEF) table in accordance with the invention.

DETAILED DESCRIPTION

The following includes a detailed description of the best mode or modes presently contemplated by the inventor for carrying out the invention. It is to be understood that these modes are merely exemplary of the invention. The detailed description is not intended to be taken in a limiting sense.

Figure 1A:
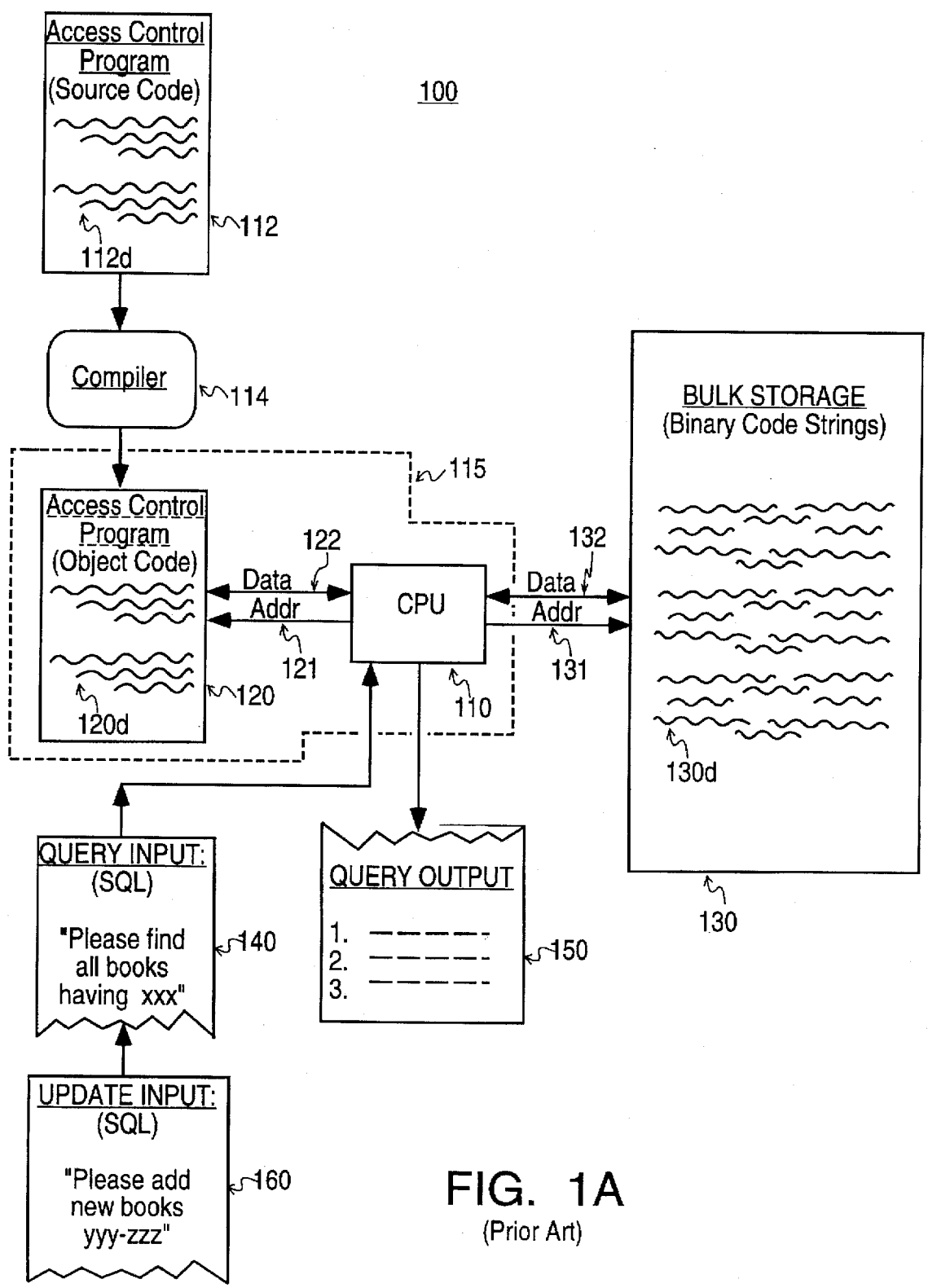
FIG. 1A is a block diagram of a conventional database system.

Referring to FIG. 1A, the block diagram of a conventional database system 100 is shown. The database system 100 comprises a central processing unit (CPU) 110 which is operatively coupled so as to be controlled by an access control program (object code) 120d stored in a first memory means 120 (i.e., read-only-memory, ROM, or random access memory, RAM). The CPU 110 in combination with the first memory means 120 can be viewed as one or more machine means for performing functions specified by the object code 120d. The CPU 110 is further operatively coupled to access the data 130d of a "bulk storage" second memory means 130 also included in the database system 100. Individual strings of digital information are represented by wiggled lines (e.g., 120d, 130d) in FIG. 1A. The bulk storage means 130 typically takes the form of a large array of magnetic disk drives, tape drives, or other mass storage devices (e.g., arrays of Dynamic Random Access Memory [DRAM] chips). The first (control) memory means 120 usually takes the form of high speed RAM and/or ROM.

To access a particular string of data 130d stored within the bulk storage means 130, the CPU 110 must provide a corresponding address signal 131s (FIG. 1B) in the form of logic highs (H) and lows (L) to the bulk storage means 130 over an address bus 131. As seen in the time versus logic-level graph of FIG. 1B, the address signal 131s (usually an electrical signal) comprises a set of logic high and logic low levels (H and L) transmitted in a first time period $t_0$–$t_1$. There follows a second time period, $t_1$–$t_2$, which is often referred to as an "access delay", during which addressing circuits attempt to access the addressed memory location. Depending on whether a memory read or memory write operation is occurring, data signals 132s are then transferred over a data bus 132 (FIG. 1A) from the addressed location within the bulk storage means 130 to the CPU 110 or vice versa during a following third time period, $t_2$–$t_3$.

Figure 1B:
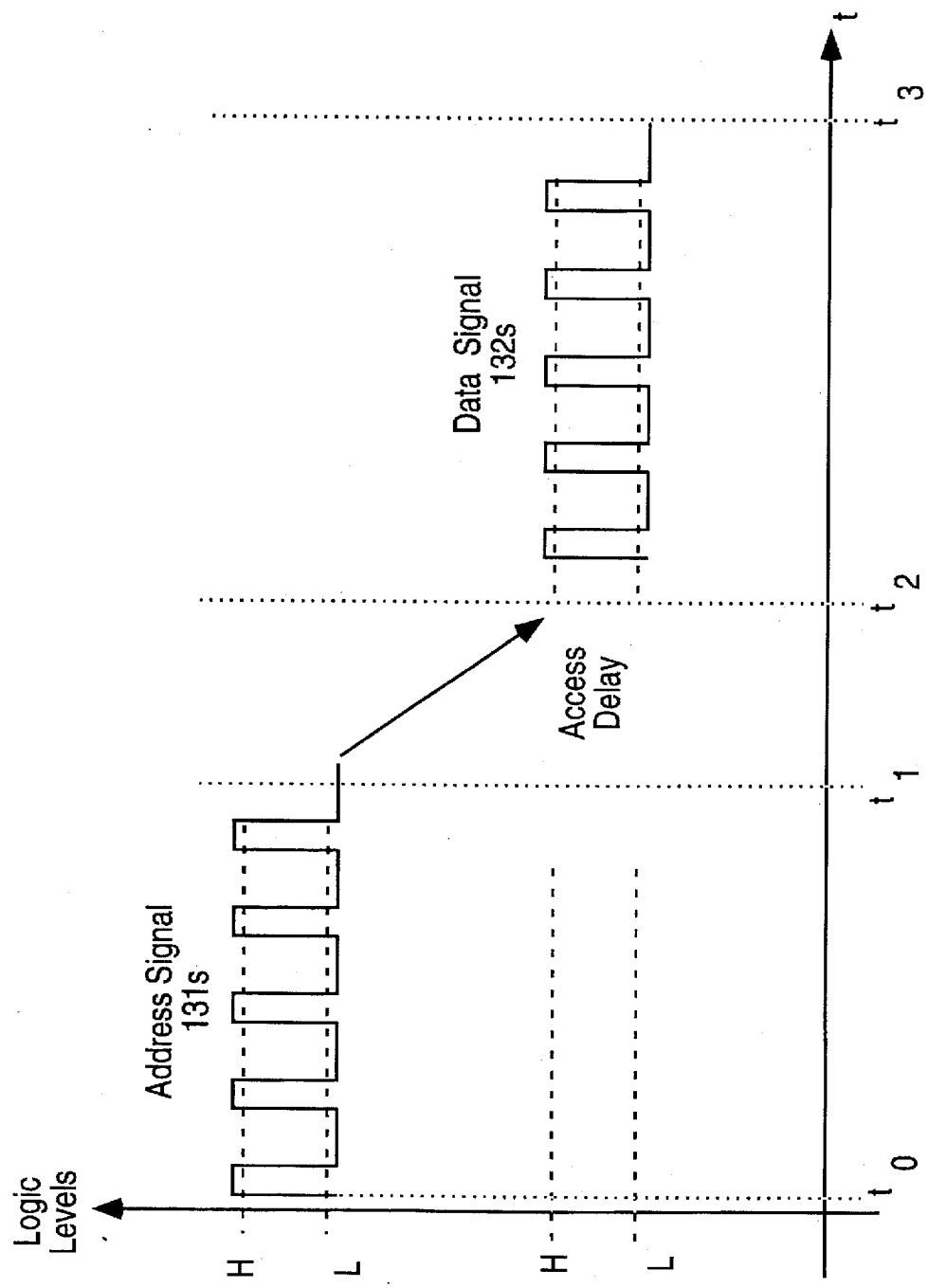
FIG. 1B is a timing diagram showing the delay between the addressing and the delivery of storage data.

Referring still to FIG. 1A, the object code 120d of the access control program determines when and how the CPU 110 will access information 130d stored in the bulk storage means 130. The CPU 110 issues address signals 121s (not shown) over an address bus 121 to the first memory means 120, and in response, the first memory means 120 supplies instruction signals 122s (not shown) over a data bus 122 to the CPU 110. Information signals 122s can be exchanged bidirectionally over data bus 122 between the CPU 110 and the first memory means 120. FIG. 1B may represent the timing relation between address signals 121s and first memory information signals 122s by replacing reference numerals 131s and 132s with 121s and 122s, respectively.

It should be understood that neither the object code 120d of the first memory means 120 nor the data code 130d of the mass storage means 130 is in human-readable form. A translation machine is needed to convert the binary bit strings of either memory means (120 or 130) into a form which might be understandable to an experienced computer programmer or to a lay computer user.

The object code 120d of the access control program is produced by first generating (e.g., manually writing and encoding) a source code listing 112 whose lines of information 112d are usually understandable only to a highly trained computer programmer. The source code listing 112 which is written in an assembly level or higher level language (e.g., C, COBOL, FORTRAN, PASCAL, etc.) is transformed into machine-readable form, and passed through a first translation machine which may be referred to as a compiler (or assembler) means 114. The compiler means 114 produces the machine-readable object code 120d according to instructions provided by a machine readable version of the source code listing 112. After it is stored in the first memory means 120, the object code 120d is expressed as machine detectable alternations (ones and zeroes) in a physical attribute (e.g., voltage) of the medium which makes up the first memory means 120. In this form, the object code 120d is more readily convertible into data signals 122s which are understandable to the CPU 110 than into information which is understandable to a lay (non-programmer) person. It is highly improbable that a lay person will ever wish to access or understand or modify the object code 120d stored within the first memory means 120.

The information strings 130d within the bulk storage means 130 are similarly expressed as alternations in the physical property of the storage medium making up the second memory means 130. Some of the data strings 130d represent "real" data which a lay-user may wish to access while others of the strings 130d represent "ancillary" data such as sequencing keys, threading pointers or control codes which a lay-user is not interested in. The object code 120d of the control program defines which is which.

When "real" data is to be extracted from the data strings 130d within the bulk storage means 130, read and understood by a lay person, a translation process similar to compilation (or more correctly de-compilation) needs to take place. Just like the compiler means 114 functions as a man-to-machine translator, the combination of the first memory means 120 and the CPU 110 defines a second man-to-machine search-and-translate machine 115 which is used to search through parts of the bulk stored data 130d, extract relevant pieces of "real" data and convert the extracted data from machine-readable form into human-readable form. The human-readable output of the second translation machine 115 may be produced in the form of a query output listing 150 (e.g., on paper or on a video screen) as indicated in FIG. 1A.

If a lay user (defined here as someone other than a person who is an expert programmer familiar with details of the source listing 112) wishes to obtain useful ("real") information from the bulk storage means 130, the lay user will normally supply a query input 140, in a form dictated by a so-called "structured query language" (SQL) to the CPU 110. (In the illustrated example the user inputs the request string "Please find all books having attribute xxx," where xxx could be the relations "author's last name=Jones".) The combination of the CPU 110 and first memory means 120 (which combination forms the second search-and-translate machine 115) process this query input 140 and in response, produces a series of address signals 131s which are sent to the bulk storage means 130 and processes a series of data retrievals 132s which eventually lead to the production of a corresponding query output listing 150. (In the example, it would be a listing of all books whose author's name is "Jones".) The access control program 120d is charged with the task of enabling various types of queries 140 and making sure that the queries do not violate basic rules of logic.

When the information 130d within the bulk storage means 130 needs to be updated, by for example adding new books, a similar exchange occurs between the translating machine 115 and a lay user. The lay user supplies an update input 160, again as dictated by a pre-specified structured query language (SQL), and in response, the translating machine 115 rearranges the data 130d within the bulk storage means 130 to achieve the requested update.

Figures 1, 2A:
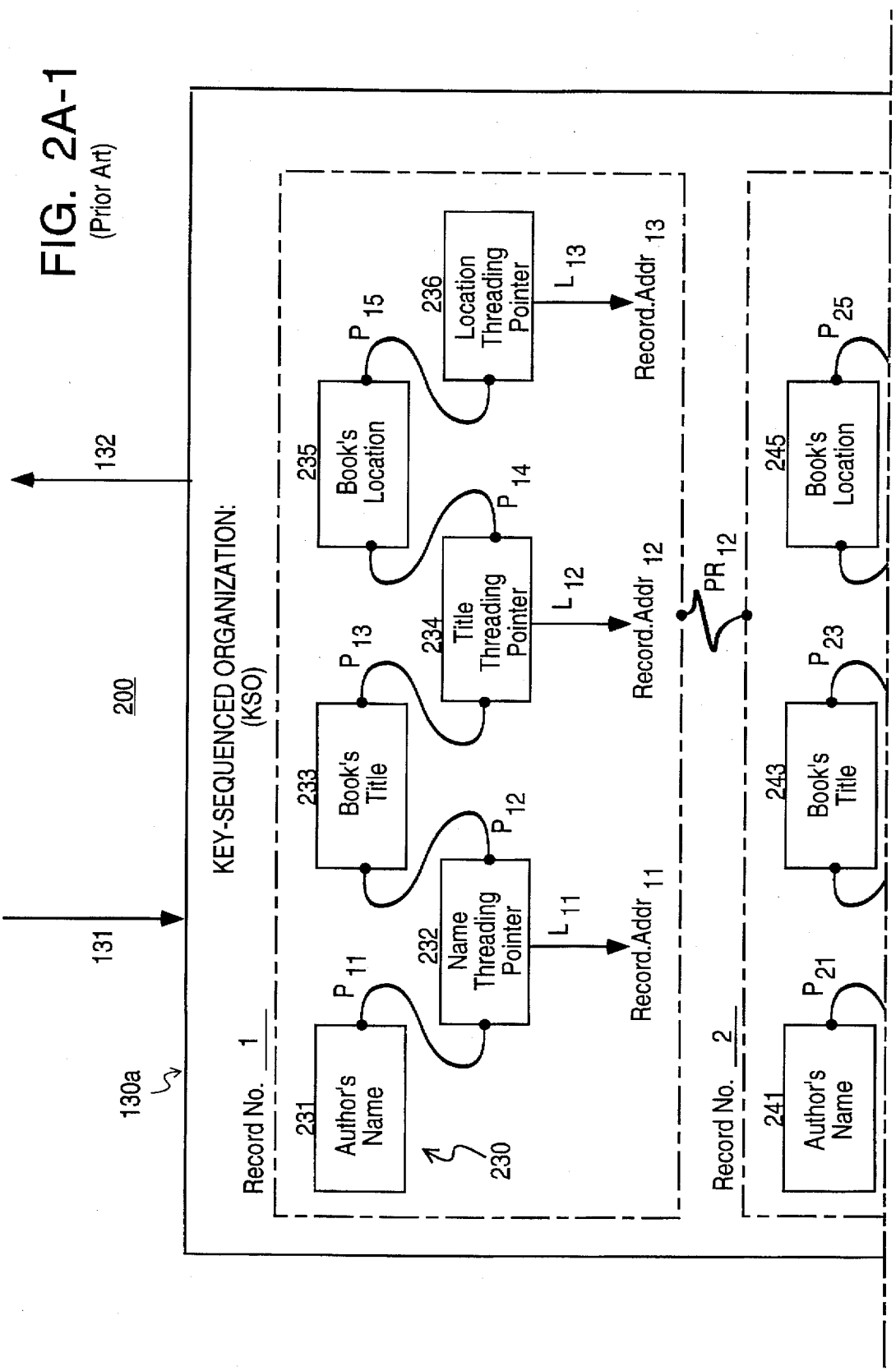
FIG. 2A is a block diagram of a conventional key-sequenced table organization.

Referring to FIG. 2A, a first embodiment 200 of the data base system 100 will be described in more detail. FIG. 2A schematically illustrates a section 130a of the bulk storage means 130 according to embodiment 200 wherein some of the stored data strings 130d are arranged to define a key-sequenced type of table. In a first record region (Record No. 1) of the table 130a there is provided a first continuous data string 230 which is subdivided to have a first string portion 231 representing an author's name (illustrated as the contents of a rectangular box), a second string portion 232 contiguous thereto for representing a name threading pointer (illustrated as a second rectangular box coupled to the first rectangular box by an address proximity link $P_{11}$), a third data string portion 233 representing the book's title (which is linked to the second portion 232 by proximity link $P_{12}$), a fourth subsection 234 representing a title threading pointer (linked to box 233 by address proximity link $P_{13}$), a fifth subsection 235 representing the book's location (linked to box 234 by proximity link $P_{14}$) and a sixth subsection 236 representing a location threading pointer (linked to box 235 by proximity link $P_{15}$).

The name threading pointer 232 is located directly adjacent to the author's name subsection 231 within the address space of Record No. 1, as indicated by address proximity link $P_{11}$ and thus, there is an "implied" logical connection between the data contents of boxes 231 and 232. The book's title subsection 233 is located directly adjacent to the name threading pointer 232 as indicated by address proximity link $P_{12}$. The combined, proximity linkage, $P_{11}$–$P_{12}$, "implies" a relationship between the contents of boxes 231 and 233, namely that they apply to various attributes of a common book. This format repeats for data subportions 234–236. Only boxes 231, 233 and 235 contain "real" data which is useful to a lay person. The other boxes, 232, 234 and 236 of Record No. 1 contain "ancillary" data which is useful to the search machine 115 but does not provide the kind of "real" information sought by an inquiring lay person.

The implied relations between the "real" data boxes, 231, 233 and 235 of Record No. 1, arise only after "meaning" is assigned to all the boxes 231–236. Such "meaning" comes from the operation of the search-and-translation machine 115 (FIG. 1). To understand this concept, assume that an automated "searching" machine (computer) 115/200 of embodiment 200 is examining the data string 230 held within the single Record No. 1. Assume further that this searching machine 115/200 includes means for assigning appropriate "meanings" to each of the data subportions contained in each of subsections 231–236 to thereby designate some as containing "real" data and others as containing "ancillary" (e.g., pointer) data. In that case the search machine 115/200 can scan horizontally across the record, parse the data string 230 into subsections of appropriate size and extract the name of the book's author, the book's title and the location of the book within the library, as desired. On the other hand, if the searching machine 115/200 does not possess information which tells it that box 232 is a threading pointer, box 233 is a title, etc., then all boxes will look alike to the search machine, there will be no "meaning" assigned and the search machine 115/200 will not be able to extract a desired piece of data. Thus, while not shown in FIG. 2A, it is to be understood that there is a cooperative relation between how the object code 120d of the search machine 115/200 causes that search machine to access the parts of bit string 230 via the signal busses, 131 and 132, how subportions of bit string 230 become designated as "real" or "ancillary" data, and how relations are implied between separate pieces of real data. The structure, meanings interrelations between the parts of bit string 230 are intimately linked to the structuring of the object code 120d.

In FIG. 2A, the bulk memory means section 130a is shown to include additional record areas (Record No. 2, Record No. 3, etc.) each having the same data structure (represented respectively as string 240 which comprises data subsections 241–246 and string 250 which comprises data subsections 251–256). Although Record No. 1 is in physical proximity with Record No. 2, as indicated by physical (or address) proximity link $PR_{12}$, and Record No. 2 is in physical proximity with Record No. 3 as indicated by physical proximity link $PR_{23}$, the data items (231–236, 241–246, 251–256) within each record do not need to be examined according to this physical ordering. Instead, the name threading pointer 232 of Record No. 1 can represent the address of any other arbitrary record area within the bulk storage means section 130a whose author's-name will serially follow the author's-name of box 231 during a search process. This is represented in FIG. 2A by the dashed logical link $L_{11}$ which points to some arbitrary record area, Record.Addr.$_{11}$ of section 130a. The name threading pointer of the referenced record, Record.Addr.$_{11}$, can point to yet another arbitrary record. With this mechanism, a list which is sorted (alphabetically for example) according to author's last name may be formed even though the records are not physically ordered in any specific sequence. The list is referred to as a "key-sequenced" list in cases where, as here, the sequencing key (or sort key) is data stored in the boxes e.g., 231, 241, 251, etc. of a table column.

The title threading pointers (234, 244, 254) of each record may be used to form a different key-sequenced path in which books are examined according to subject matter or alphabetically according to the book's title or according to some other ordering algorithm. The location threading pointers (236, 246, 256) can be similarly used to create a key-sequenced list which will identify what book is physically located next to what other book on the library's shelves.

For the sake of illustrative simplicity, only one threading pointer (i.e., 232) is shown attached to each real data item (i.e. 231) of each record, but it should be apparent that the author's name 231 may have many threading pointers, one for threading alphabetically according to last name, and others for threading according to additional relations such as geographic location, age, number of published books and so forth. It is up to the computer programmer and the access control program 120d to assign "meaning" to each box and thus determine whether that box will function as a storage area for real data or for ancillary data such as pointer data.

The records of FIG. 2A may be visualized as being serially stacked one on the next according to a sequence defined by a preselected one of the threading pointers (e.g. 232 or 234 or 236) to thereby create a displayable table which has as entries in the columns of each row, the real data items: author's name 231, book's title 233 and book's location 235. The ancillary threading pointers 232, 234, 236 are hidden from the lay user's view. New rows are added to the table by breaking a logical link (e.g., $L_{11}$) between a preceding pointer (e.g. 232) and a next pointer (e.g. 252) to insert a new record in the search path. The rows can be of variable length since the linking address pointers can point to any arbitrary location in the bulk memory means 130. To get to the $N^{th}$ item of a threaded list, one normally sequences from the beginning of the list (table) through all the threading pointers until the $N^{th}$ access is performed, at which point the contents of the addressed record area can then be read. For relatively large tables (e.g. those having thousands of rows), this process of sequencing through all the threading pointers to reach the $N^{th}$ row of a table can take a significant amount of time.

Referring to a second embodiment 260 shown in FIG. 2B, the structure of an older and less sophisticated data organizing system will be described. In a bulk memory section 130b of this older system 260, data is organized according to what is commonly referred to as "relative table" addressing. Threading pointers are not used for logically linking one record (row) to the next. Instead, each data string (e.g., 270) can be shrunk to contain only the essential target information, such as in this example, author's name (271), book's title (273) and book's location (275), with one item of real data being physically located adjacent to the next. The examination of all record items in this structure 260 may be performed according to the physical location of each record (270) within the address space of bulk storage area 130b (the next adjacent string 280 follows first string 270 and so forth). Unlike the purely key-sequenced organization of FIG. 2A, the physical proximity links $PR_{o12}$, $PR_{o23}$, $PR_{o34}$, etc., of FIG. 2B do indicate a particular ordering of the stored information.

The relative-table organization is somewhat similar to the way that index cards are physically ordered in a manual library system according to author's last name, except that the library catalog trays should now be visualized as having sequentially arranged grooves defined on their bottom-inner surfaces. Each groove is numbered according to its absolute position and only one card can be slotted into each groove. With this system, each card can be immediately located by its groove number rather than by thumbing through the information of all previous cards. If a groove number is known, substantial time can be saved in locating the corresponding card and obtaining the information written on its face. If the groove number is not known, the same relative-table organization can be searched by sequentially thumbing through the trays and examining the cards according to a key-sequenced approach in order to find a desired card even though the cards are stored in grooves. The relative-table organizing method is not mutually exclusive of a key-sequenced examination method. There is a difference between a purely key-sequenced table and a relative table, however. A relative-table organized system is not as easily updated as is a purely key-sequenced system. In the relative table system, a new card cannot be inserted between two cards which already fill adjacent slots. This inflexibility has led many in the database management field away from the relative-table method and towards purely key-sequenced systems since the latter can accept any number of new cards for insertion between old cards.

Figures 1, 2B:
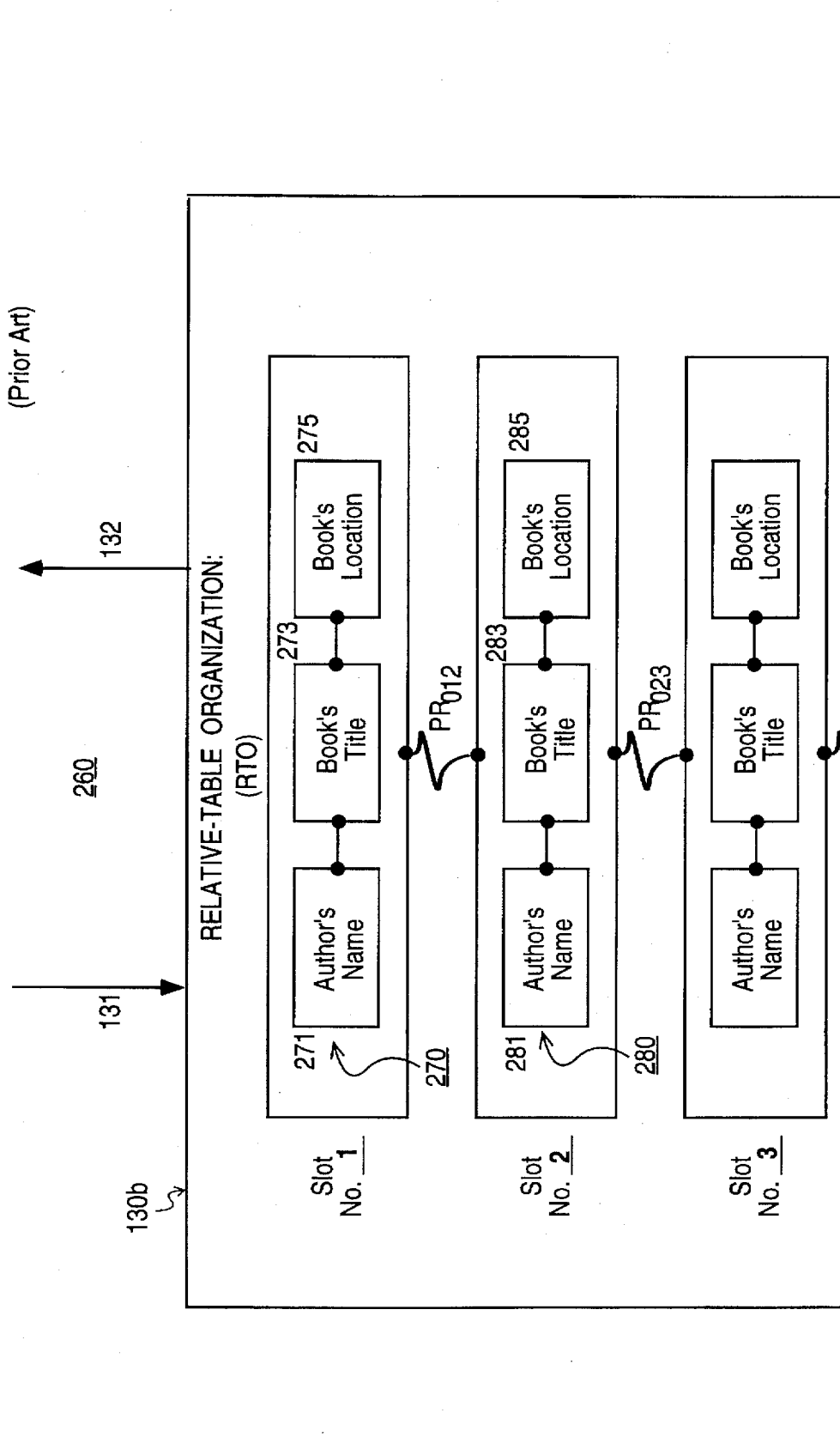
FIG. 2B is a block diagram of a conventional relative-record table organization.
Figures 2, 2B:
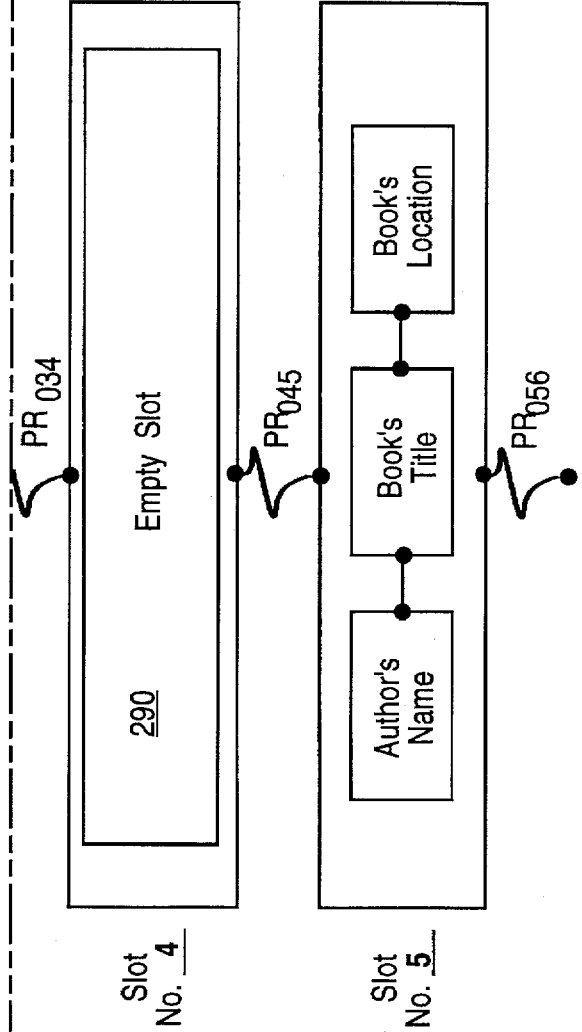

In FIG. 2B, all the record areas are of a fixed and predefined length. The fixed length of each record defines the groove size. To access the $N^{th}$ item of a "relative-table" type of list 130b, one need only multiply the fixed record length by the value N to directly obtain the physical address (slot) of the desired record. There is no need to sequence through a chain of threading pointers in order to find a desired row once its slot number (groove number) is known. Empty slots 290, such as the slot number 4 shown in FIG. 2B, are preferably scattered throughout the address space of the bulk memory section 130b to allow for occasional insertion of new items.

It should be noted that while the relative table organization 130b of FIG. 2B is neither as flexible nor as easily updated as the key-sequenced organization 130a of FIG. 2A, the relative-table structure 130b has one major advantage over the key-sequenced structure 130a; an $N^{th}$ item in a relative-table list 130b may be accessed much faster than the $N^{th}$ item of a key-sequenced list 130a.

Figure 3A:
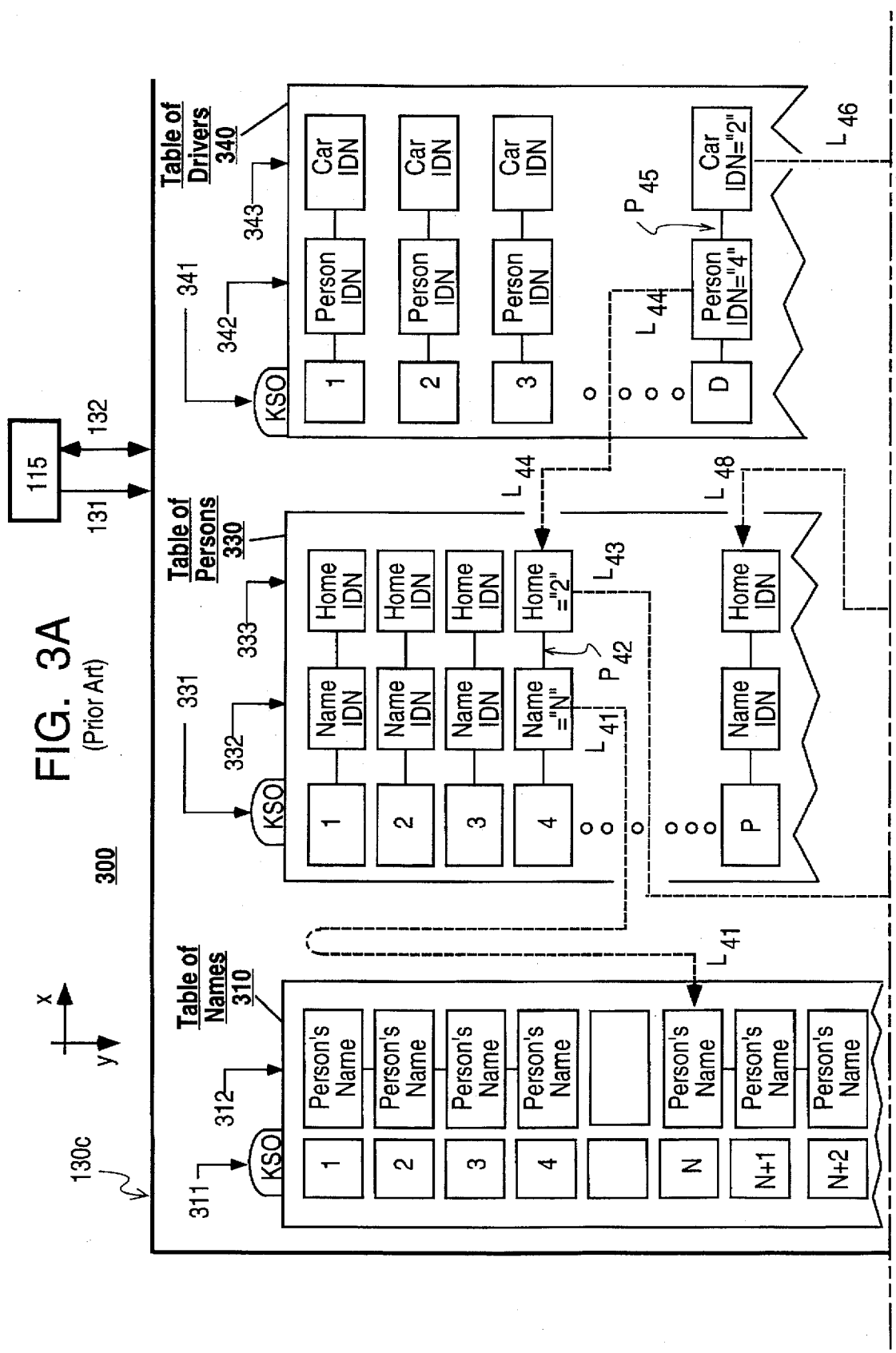
FIG. 3 diagrams a multiple table system which is based on a conventional relational database approach and which has key-sequence organized tables.
Figure 3B:
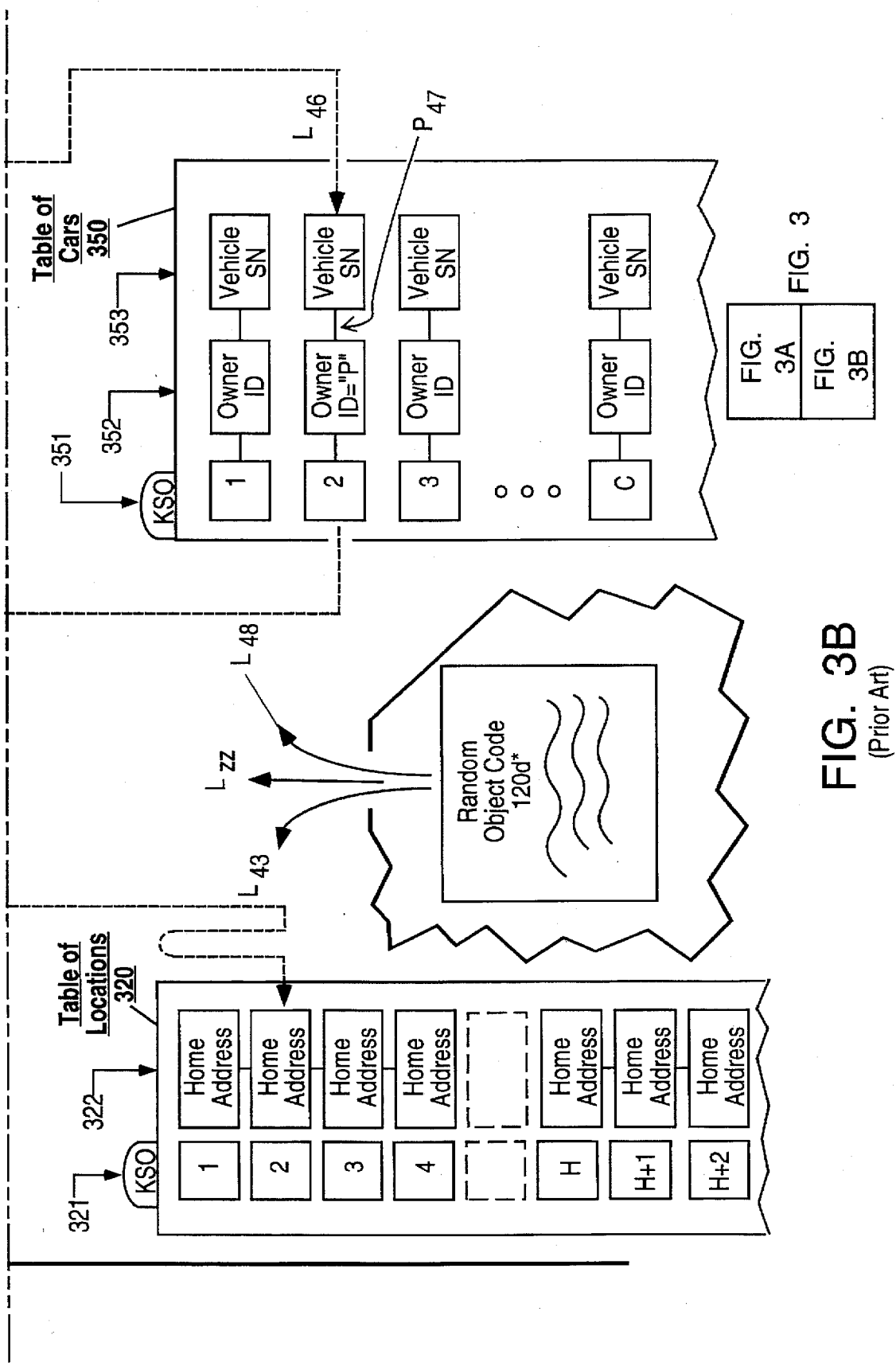

FIG. 3 is a block diagram of a bulk storage area 130c whose data 130d is organized according to a known key-sequenced scheme which is often referred to in the industry as a "relational" database. A "tables" area 300 contains a plurality of tables 310, 320, 330, 340 and 350. Each of these tables is defined purely by a threaded-list, key-sequenced structure such as shown in FIG. 2A. For the sake of illustrative brevity the list threading pointers (i.e., 232, 234, 236) are not shown. Only the non-threading boxes (i.e., 231, 233, 235) are shown.

Rows are illustrated to extend horizontally (in the "x" direction) in FIG. 3 while table columns are illustrated to extend vertically (in the "y" direction). Each table 310–350 is shown to have its respective rows sorted numerically according to "key" numbers that are stored in its leftmost column (referred to here as the "sort column").

A first of the key-sequenced tables, 310 (also labeled "Table of Names"), is shown to have two columns. One (right side) column 312 holds "real" data representing the names of various persons while a preceeding (left side) column 311 holds unique key-numbers, 1, 2, 3, ..., N, N+1, N+2, ..., each associated with a unique name of a person. The association of a person's name to a key-number is "implied" by the fact that the key number 1, 2, 3, ..., N, ..., is located in the same row of table 310 as is the corresponding "Person's Name". Each key-number of left column 311 is referred to as a "Name Identification Number" (abbreviated here as N-IDN). Table 310 is shown to have been pre-sorted according to the N-IDN's of column 311. The sorting method is indicated in FIG. 3 by positioning the initials "KSO" over column 311 to tag that column as the Key-Sequenced-Ordering column of table 310.

To find the name of a person within table 310 whose associated identification number is known to be N, one normally starts at row number 1 of the left column 311, where the N-IDN of the first person's name is stored and threads downwardly (in the y direction) through the threaded-list pointers (not shown) associated with this sort column 311, testing each corresponding entry of column 311 for a match until the position holding the number N is found. Then one moves horizontally (in the x direction) across that row to the right column 312 to extract the name associated with the $N^{th}$ name identification number (N-IDN).

When an automated search machine 115 performs this thread and test process, it must retrieve data from the memory area 130c at least N times before the target data (Person's-Name) is retrieved. The time for retrieving the target data is thus at least N times the access delay period (e.g., the $t_2-t_1$ period of FIG. 1B) of the memory means 130. By way of example, if N=1000 and the access time of memory means 130 is 30 milliseconds, then it can take 30 seconds or more just to retrieve one name. If a thousand names are to be randomly retrieved at different times from the range N, N+1, N+2, ..., N+M (where M would be 1000 or higher), then it can take as much as 30,000 seconds (8.3 hours) or longer just to perform this simple table look-up task.

The N-IDN field of each row is generally made much shorter in bit length than its associated Person's-Name field. The N-IDN can be viewed therefore as an abbreviation of a person's full name. The first table 310 can be viewed as a conversion list or look-up table which allows one to easily convert a given abbreviation (N-IDN) into a full name.

A second, separate, table 320 (also labeled as "Table of Locations") is shown to contain two similar columns. Right column 322 stores "Home Addresses" in full while left column 321 holds unique, Home-Identification-Numbers (abbreviated H-IDN) which are generally shorter in bit length than the associated "Home-Address" fields. The H-IDN'S thus can serve as abbreviations for the full address fields. Table 320 is ordered numerically according to the H-IDN's as indicated by the legend "KSO" over column 321. The table 320 can therefore easily serve as part of an H-IDN abbreviation to full address converting means.

Since many people often live at a single home address, it is plausible that a single home address will be shared by persons of different names. Relational database theory recognizes this and teaches to separate information (e.g., home address) that might be shared by many entities away from any unique one of those entities (e.g., person's name). Table 310 is accordingly separated from table 320. Concurrently, it should be possible to relate a person's full name to a full home address without having to repeatedly duplicate the full name string or full address string within the bulk storage means 130. The data organization 300 shown in FIG. 3 includes a third key-sequenced table 330 which is structured for doing just that; linking one persons' name with one home address while using the abbreviated bit strings, N-IDN and H-IDN.

Third table 330 comprises three vertical columns, 331, 332 and 333. Left column 331 holds Person Identification Numbers (P-IDN's), 1, 2, 3, ..., P. The rows of third table 330 are sorted using the P-IDN's as the sort key. For each row of the third table 330, the second column 332 contains a Name-IDN and the third column 333 contains a Home-IDN. Each Name-IDN of third table 330 (for example, at row 4 of table 330 whose column 332 contains the value "N") should have in the left column 311 of the Names table 310 a matching key number (e.g., the number N which is pointed to by arrow $L_{41}$). Thus an N-IDN stored in the third table 330 can be used to indicate the row within the first table 310 where a person's full name may be found. Each Home-IDN of the third table 330 should similarly have a matching key number (e.g., the number 2 which is pointed to by arrow $L_{43}$) within left column 321 of the second "Locations" table 320 at whose row a corresponding full home address may be found.

Each row (e.g., row 4) within the third table 330 implicitly creates a set of logical links or "relations", $L_{41}-P_{42}-L_{43}$ which join a person's name to a particular home address. These links, $L_{41}$, $P_{42}$ and $L_{43}$ are represented in FIG. 3 by dashed connecting lines which, in combination, join the Person's-Name held in table 310, row N, to the Home-Address held in table 320, row 2. The implied linkage, $L_{41}-P_{42}-L_{43}$, does not arise from the contents of the first three tables, 310, 320 and 330 taken alone. The key numbers (e.g., N-IDN, H-IDN, P-IDN) that are held within these tables are by themselves a meaningless series of numbers. It is only when randomly distributed modules of object code 120$d$* stored within the memory means 120 of this "relational database" system (300) cooperatively interact with the CPU 110 that the implied relations come into being. The object code 120$d$* instructs the CPU 110 to select a specific row (i.e., row 4) in the third table 330, to extract the numbers from adjoining columns 332 and 333 of that row (thus implying the proximity link, $P_{42}$), to select table 310, to sequence down its KSO column 311 looking for a match to the number from column 332 (thus implying logical link $L_{41}$), to select table 320, to sequence down its KSO column 321 looking for a match to the number extracted from column 333 (thus implying logical link $L_{43}$), and to then extract from each respectively matching row of tables 310 and 320 the corresponding person's full name and full home address. It is only by performing these data processing steps, as directed by the object-code 120$d$*, that the search-and-translation machine 115 of embodiment 300 is able to link ($L_{41}$) an otherwise meaningless number (N) held in the third table 330 to a specific row (i.e. the row holding the same number N) positioned in another table (310) and to link ($L_{43}$) further numbers (i.e., the number "2" in col. 333) of the third table 330 to a specific row (i.e. the row holding the same number 2) of yet another table (320). This object-code dictated linkage $L_{41}$–$P_{42}$–$L_{43}$ then implies a "relation" between the Person's-Name field stored at row N of table 310 and the Home-Address field stored in row 2 of table 320. Arrow $L_{zz}$ denotes that all illustrated linkages ($L_{41}$–$L_{48}$) in FIG. 3 spring forth from randomly-distributed object code modules 120d* of the access control program 120d. Note that the third table 330 assumes by its three column structure a one-to-one cardinality between person-name and home-address. It is assumed that a person can have only one home address. The structure of table 330 is incapable of handling a situation where a person has, for example, both a summer home-address and a winter home-address. Restructuring of the third table 330 would be called for if it becomes desirable to associate each person's name with more than one home address.

A number of advantages come from organizing the tables of data storing area 300 separately according to relational database theory. Storage space is conserved in cases where plural entities of a first type (person) are related to a common entity of a second type (home address). The same Home-IDN can appear many times down column 333 without consuming large amounts of memory space while the actual full address is stored only once in second table 320. When a person moves to a new home address, the corresponding Home-IDN in column 333 can be easily altered to point to a new position within the second table 320 which contains the new home address (e.g., H+1) thereby implying the new person-to-address relation. If a person changes their name (i.e., by way of marriage) the home address can remain the same. Only the first table 310 needs to be modified and updating work is thus minimized. Also, the basic listings "Names" 310 and "Addresses" 320 can be used to imply a wide variety of "relations" other than a relation between a person's name and his/her home address using the same abbreviated set of identification numbers (IDN's).

By way of example, assume that the first three tables, 310, 320 and 330, are used by a business institution (company) to keep track of the names of their employees and the corresponding home addresses of these employees. Let it be supposed that many employees need to commute to work by a privately-owned car. Some employees drive their own car, some drive a car owned by another employee and some are merely passengers. Let it be further assumed that after tables 310, 320, 330 are defined in a mass storage means 130, the company decides to also keep track of which person drives which car, which person is a passenger in which car and further, who the owner of the car is.

A fourth table 340 (Table of Drivers) may be constructed as shown in FIG. 3 to have a first key-sequenced column 341 storing plural driver identification numbers (abbreviated here as D-IDN's), 1, 2, 3, . . . , D. A second column 342 is provided for holding person identification numbers (P-IDN's) and a third column 343 is provided for holding car identification numbers (C-IDN's). A fifth table 350 (Table of Cars) may be similarly constructed as shown with a first KSO column 351 for holding the C-IDN's (1, 2, 3, . . . , C), with a second column 352 for holding owner identification numbers (O-IDN's) which will point to the one person who owns the vehicle and with a third column 353 for holding a vehicle serial number (SN). While not shown, it should be apparent that a sixth table (Table of Passengers) would be constructed with the same organization as that of fourth table 340 to identify passengers and their corresponding car.

Referring to row D of table 340, it can be seen that one implied link L44 identifies driver D as being the person of P-IDN=4 who has the name implied by earlier link $L_{41}$ and the home address implied by earlier link $L_{43}$. Proximity link $P_{45}$ implies that driver D drives the car having C-IDN=2. The latter number implies a logical link $L_{46}$ to row 2 of table 350 which holds the serial number (SN) of the driven car. By way of another proximity link, $P_{47}$, in row 2 of the same fifth table 350, a further logical link, $L_{48}$, indicates that the owner of car C-IDN=2 is the person P-IDN=P of table 320. It was assumed by the structure of table 350 that each car can have only one owner and one serial number.

Consider, however, what happens if a new government regulation comes into being allowing for more than one owner per car or requiring multiple identification numbers for each car. The fifth table 350 may have to be restructured to add new columns (i.e., 354, 355, etc.; not shown) which would allow for the implication of such new relations. This means that the access control modules 120d* which define the "meaning" of each data field (subsection) within table 350 would have to be revised. Referring back to FIG. 1 it can be seen that modification to the control code 120d* will usually occur first in the original source code 112, which is then compiled 114 as indicated in FIG. 1, debugged to correct programming errors (not shown) and thereafter repeatedly compiled 114 and debugged until all apparent errors are removed. The process of restructuring relations within a relational-type database system (300) therefore tends to be time-consuming, costly, and prone to error.

A newer form of database organization, referred to sometimes as the "object oriented" approach, has been proposed to solve some of the problems associated with reorganizing and updating previous database systems. According to the object-oriented approach, encapsulation bubbles are defined to hide from external view, data which is encapsulated within the bubble. Each bubble is referred to as an "object" and the encapsulated information of the object is referred to as the object's "attributes." One bubble may encapsulate a second bubble which in turn encapsulates third, fourth and further bubbles so that a relatively complex data structure may be defined. Objects can be assigned to "classes" and by such assignment they can be made to automatically "inherit" the attributes of other objects in the same class, even when the class attributes are changed after creation of the objects.

There is still controversy in the field over what constitutes "object oriented" and how such a concept may be practically applied to database management systems. Experimental versions of object-oriented systems are often too slow in performing update and inquiry servicing to be practical in commercial settings. The present invention takes an approach which might be considered a partial hybrid of the object-oriented approach and the earlier-described relational database methodology. It provides a database system which is capable of operating at commercially acceptable speeds and which is easily restructured as well as updated. The invention will be explained first conceptually and then by concrete examples.

Figure 4A:
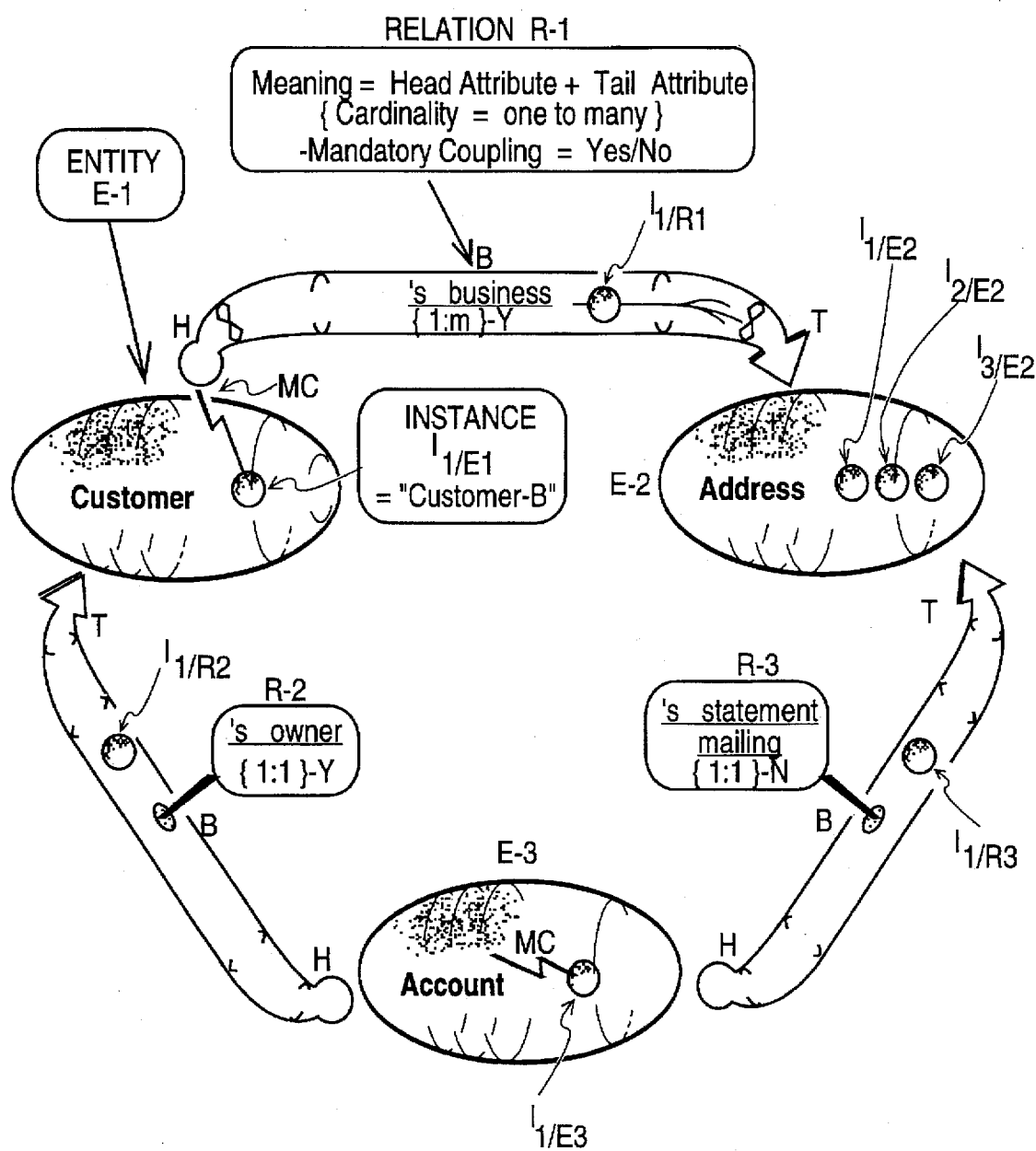
FIG. 4A is a conceptual diagram illustrating an entity-relation schema in accordance with the invention.

Referring to FIG. 4A, there is shown a relational graph or "schema" 400 which contains three egg-shaped bubbles labeled respectively as "Customer", "Address" and "Account". These bubbles are not intended to represent "objects" from the object-oriented school of thought, but rather "classes" of entities. Each of these bubbles is referred to as an "entity type" or "entity class". The "Customer" entity class generically covers all entities which might fit under the broad descriptor "Customer", regardless of whether that entity is a natural person, a business corporation, an association or so forth. The "Address" entity class covers all entities which fit under the broad descriptor "Address" regardless of whether the subject entity is a residential address, a business address, a post-office mailing address or so forth. Similarly, the "Account" entity class covers all sorts of accounts including savings accounts, checking accounts, trust accounts, etc.

Each entity bubble may contain one or more "instances" of the entity class (i.e., Customer, Address, Account) which it represents. By way of example, let it be assumed that there are three customers whose names are "Customer-A", "Customer-B" and "Customer-C". Let it be further supposed that because of a peculiar rule, the Customer bubble (also labeled as entity class "E-1") is restricted to contain the name of only one customer at a time, say "Customer-B", while the address bubble (E-2) can at the same time contain many "addresses", each corresponding to that Customer-B. If Customer-B is a person, the address instances might be summer-home and winter-home addresses. If Customer-B is the name of a business having a chain of stores, the plural addresses in the second bubble (E-2) might be the mailing addresses of those stores. The name "Customer-B" is an example of a first instance, $I_{1/E1}$, of the E-1 entity class and is illustrated conceptually in FIG. 4A as a small sphere $I_{1/E1}$ enclosed in the entity class bubble E-1. Three instances, $I_{1/E2}$, $I_{2/E2}$ and $I_{3/E2}$ of entity class E-2 are similarly illustrated as three spheres inside of entity bubble E-2. It is also assumed here that the Account bubble (E-3) is restricted by a peculiar rule so that at any one time it may contain only one account number (instance $I_{1/E3}$) which is somehow associated with Customer-B.

Until now we have been visualizing the instances, $I_{1/E1}$, $I_{1/E2}$, $I_{2/E2}$, $I_{3/E2}$ and $I_{1/E3}$ of respective entity classes, E-1, E-2 and E-3 as isolated spheres floating separate from one another, without identifying any specific relation between the instances. The present invention treats "relations" as being objects of equal substance to the entities they tie together. There are relation "classes" and instances of a specified relation class. Three arrow-shaped bubbles, R-1, R-2 and R-3, are shown in FIG. 4A to be respectively coupling the Customer entity class (E-1) to the Address entity class (E-2), the Account entity class (E-3) to the Customer entity class (E-1) and the Account entity class (E-3) to the Address entity class (E-2). These linking bubbles (R-1, R-2, R-3) are referred to here as "relationship" types or classes. Each relation bubble R-x (where x is an arbitrary identifier, 1, 2, 3, etc.) is visualized as having a bulb-shaped Head portion, H, an elongated body portion B and an arrow-shaped Tail portion, T. A "Head attribute" can be assigned by each relation bubble R-x to the entity bubble (E-h) located at its head end (H). A "Tail attribute" can be correspondingly assigned by each relationship bubble R-x to the entity bubble (E-t) located near its tail end (T). The combination of the Head-attribute, if any, plus the Tail-attribute, if any, can be used to give the relationship bubble (R-x) a "meaning". This meaning is generated by associating with the body portion B of each relationship bubble (R-x), a "meaning-string" which preferably, but not necessarily, has a head character-string and a tail character-string. The combination of an "entity-class name" (ECN-h) associated with the head entity type (E-h), the meaning-string (M-s) of the connecting relation type (R-x) and another entity class name (ECN-t) associated with the tail entity type (E-t) are concatenated according to the formula, (ECN-h)+(M-s)+(ECN-t), to expressly define a relational phrase. The expressly defined phrase can be modified by changing any one or all of its three components; (ECN-h), (M-s) and (ECN-t).

In more concrete terms, the top relation bubble R-1 is shown to have the meaning string "'s business". The substring, "'s" is a head character-string while the substring "business" is a tail character string. By itself, the meaning-string ('s business) appears to be nonsensical, but in conjunction with the class names its head and tail entities, E-1 ("Customer") and E-2 ("Address"), this first relations bubble, R-1, forms the relational phrase: "The Customer's business Address". Instance $I_{1/E1}$ is a specific customer's name (i.e., "Customer-B") and instances $I_{1/E2}$, $I_{2/E2}$ and $I_{3/E2}$ are now defined as specific instances of that customer's business addresses (i.e., the addresses of individual stores in a chain of stores owned by Customer-B).

Of importance, it is to be noted that the first entity bubble, E-1 (Customer), does not itself encapsulate the attribute of possession as indicated by the apostrophed head character-string "'s". Instead, that attribute of possession is encapsulated by the first relationship bubble, R-1. Furthermore, the second entity, E-2 (Address), does not encapsulate the modifying attribute "business". Instead that attribute is also encapsulated by the relation bubble R-1. Thus, each entity bubble (E-1, E-2, E-3) is free of any narrowing attributes or modifiers and instead, represents a relatively broad and generic listing of data items which can come under the heading of either "Customer" or "Address" or "Account". The advantage of this structure will become apparent shortly.

Consider for a moment what happens if the meaning-string in relation bubble R-1 is changed from "'s business" to "'s headquarters". Under this circumstance, the rules change. The address bubble (E-2) should be restricted to at any one time contain only a single instance (e.g., $I_{1/E2}$) representing the "Customer's headquarters Address" rather than many instances. Presumably each customer can have only one headquarters address. Thus, the "cardinality" of relations bubble R-1 must be changed from its earlier one-to-many {1:m} format, as was possible with business addresses, to a one-to-one setting {1:1}. According to the invention, each relation bubble, R-x, has a cardinality rule (e.g., {1:1} or {1:m}) associated with its body B as well as a meaning- string (e.g., "'s business").

Consider, next what happens in a business database if users are allowed to enter a customer name but leave out the mailing address or telephone number of that customer. Most companies operate under a strict rule which requires its office workers to record at least one forwarding address or telephone number when the name of a new customer is entered. To enforce this requirement, each relation bubble (R-1) further incorporates a mandatory-coupling character which can be either "Y" or "N" (representing yes or no). If it is required that at least one instance ($I_{1/E2}$) of a tail entity class E-2 should be created whenever an instance ($I_{1/E1}$) of a head entity class E-1 is created, then the mandatory-coupling character of relation bubble R-1 is set to "Y". This indicates that instance $I_{1/E1}$ should not exist without instance $I_{1/E2}$. The "MC" lightning bolt shown emanating from $I_{1/E1}$ represents this mandatory coupling of instances. On the other hand, if such coupling is not mandatory, the coupling character is set to "N" and there is no "MC" connection.

As further examples of the concepts behind the invention, the second relation bubble, R-2, is shown to contain in FIG. 4A the meaning string, "'s owning", the cardinality rule, {1:1}, and the mandatory-coupling character, "Y" (presumably every account should have an owner). The third relation bubble, R-3, is shown to contain the meaning string, "'s statement mailing", the cardinality rule, {1:1}, and the mandatory-coupling character, "N" (presumably an account holder can pick up his/her statement rather than having it mailed). Instances of entity E-1 which satisfy the relationship created by relation bubble R-2 are read as "The Account's owning Customer". Instances of entity E-2 which comply with the relationship created by relation bubble R-3 satisfy the descriptive phrase, "Account's statement mailing Address", or stated otherwise, the address to which account statements are mailed for the particular instance $I_{1/E3}$ of the Account entity class E-3.

By changing the meaning-string within a relation bubble R-x, it is possible to create new relational phrases although the Head and Tail entity classes remain the same. By changing either or both of the Head and Tail entity classes (E-h or E-t), it is possible to again create new relational phrases although the relation bubble R-x remains unchanged.

Consider what happens for example when the meaning-string of relation bubble R-3 is changed to the phrase: "which is managed at bank branch having". Then the combination of the class names or meanings associated with entity bubble E-3, relation bubble R-3 and entity bubble E-2 provides for an inquiry path allowing one to find the Account which has a specific bank branch address as its managing branch. Consider what happens if the tail portion T of relation bubble R-3 where moved from E-2 to a new entity bubble (not shown) which is labeled "Managing Officer" rather than "Address". Then the relational phrase becomes "Account which is managed at bank branch having [this person as its] Managing Officer". It can be seen that an entirely different inquiry path is formed with each change of a head entity type, tail entity type or relation type.

Inquiry paths can be defined to extend through pluralities of entity and relation bubbles as well as between just two entity bubbles. Still referring to FIG. 4A, suppose that a bank officer finds an important document bearing only an account number on it. The bank officer needs to immediately contact a person who is authorized to manage that account for more details about the document. In such a case, the bank officer would turn to a database processing engine according to the invention (explained later with reference to FIG. 9), start at the known instance of the account number, $I_{1/E3}$, which is shown contained within the Account bubble (E-3), jump through the relation bubble R-2 ('s owner) to the Customer bubble (E-1) in order to learn who the owning customer is (instance $I_{1/E1}$) and then with that new information ($I_{1/E1}$) serving as a stepping stone, jump from the Customer bubble (E-1) through the relation bubble R-1 ('s business) to the Address bubble (E-2) to learn the address at which he may contact the account manager. This is merely an example, inquiry paths can include many more bubbles, they can branch out to form a tree rather than being serial and they can produce many pieces of information which are useful for solving a puzzle rather than just one piece of target information.

Figure 4B:
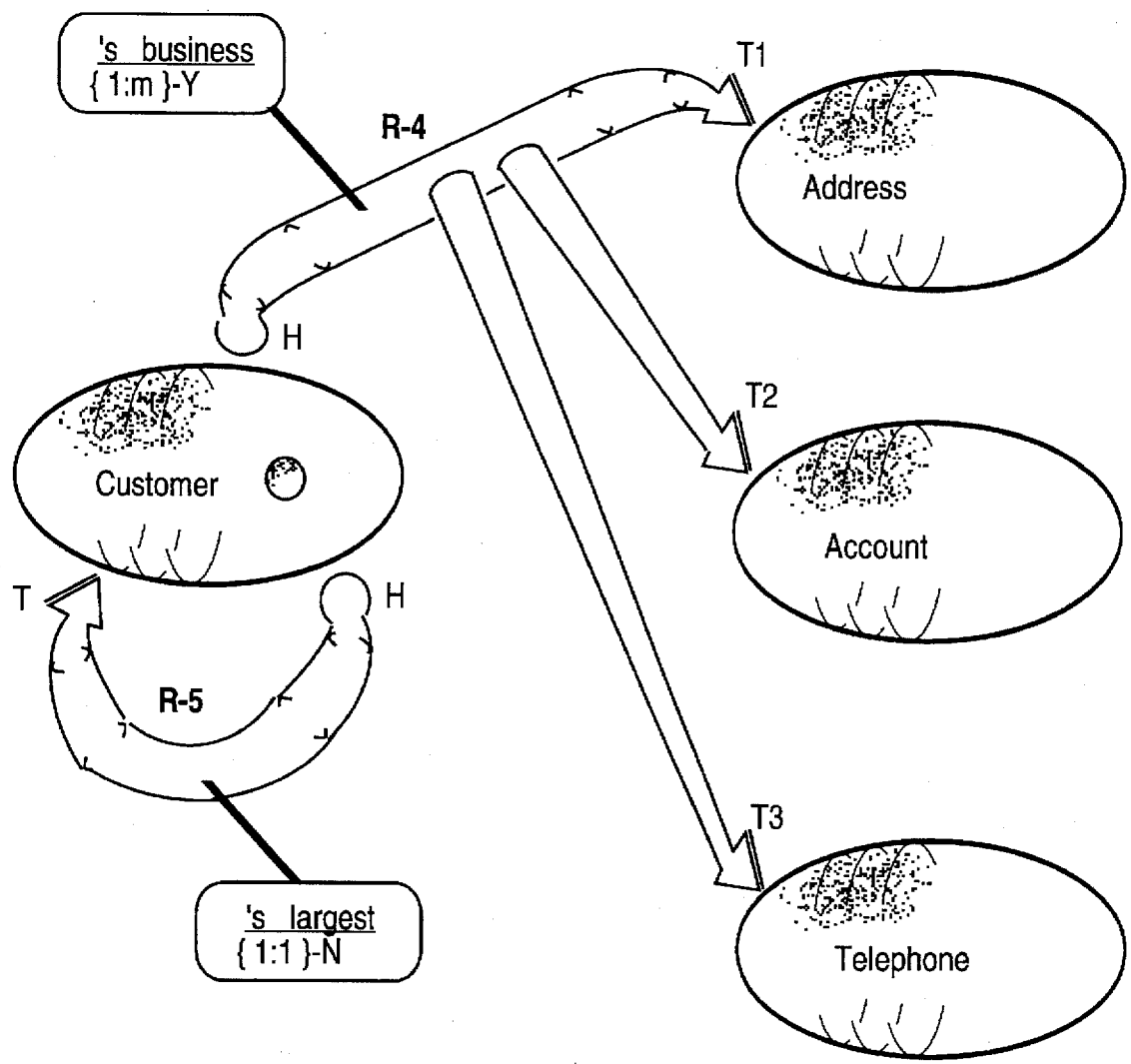
FIG. 4B is a further conceptual diagram of an entity-relation schema according to the invention.

Relation bubbles (R-x) do not have to be single tailed. Referring to FIG. 4B, further variations of the concept behind the invention are illustrated. A fourth relation bubble, R-4, is shown to have a plurality of tail ends, T1, T2 and T3, so that a single meaning-string (e.g., "'s business") can simultaneously couple a common Head entity (Customer) to a plurality of Tail entities (e.g., Address, Account and Telephone). Moreover, a relation bubble does not need to span between different entity bubbles. FIG. 4B shows another relation bubble, R-5, which folds back in a loop so that the Head entity (Customer) is also the Tail entity. In the illustrated example, the relation bubble R-5 contains the meaning string "'s largest". Given the name of a first customer, this back-looping relation bubble R-5 allows one to find that customer's largest customer. The loop may be followed around ad infinitum to obtain a long list of largest customers belonging to other largest customers.

Figure 5:
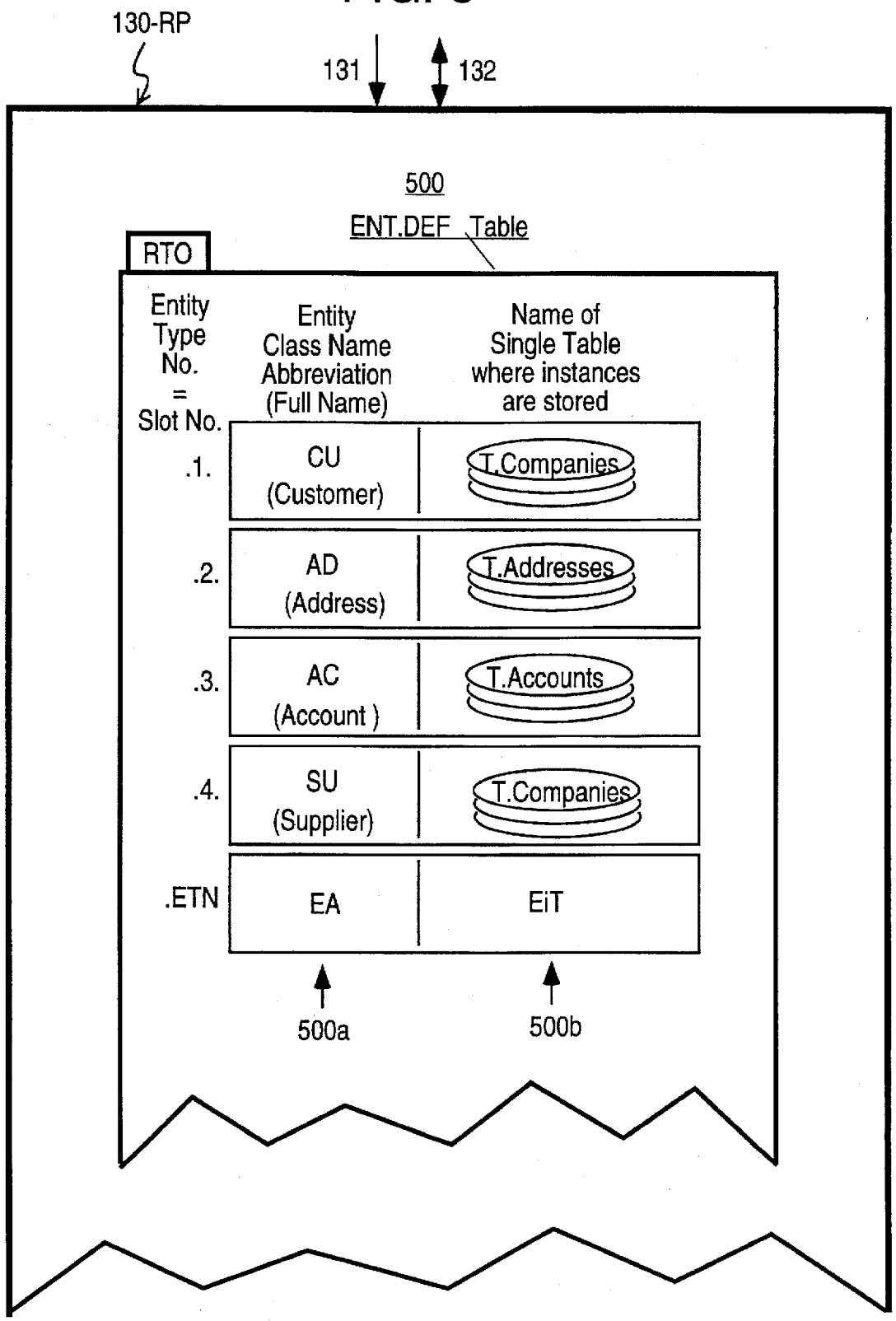
FIG. 5 is a block diagram of an entity definition (ENT.DEF) table in accordance with the invention.

With the above-mentioned conceptual models in mind, a concrete embodiment of the invention now will be constructed piece by piece. Referring to FIG. 5, there is shown a first table 500 which is referred to as an entity definition table or in abbreviated form, ENT.DEF Table 500. This entity definition table 500 is stored within a data storing area 130-RP of a database engine in accordance with the invention. Data storing area 130-RP preferably resides within a bulk storage means 130* such as diagrammed in later-to-be described FIG. 8. Unlike the earlier described tables 310–350 of the relational system shown in FIG. 3, which relied on a purely key-sequenced organization, the entity definition table 500 of FIG. 5 can rely on a relative table organization (abbreviated here as "RTO") which features faster data access properties and is also adaptable to key-sequenced search algorithms (but not key-sequenced update methods). Each row of the ENT.DEF table 500 is of a fixed bit length and has two columns. The first (left) column 500a stores a two character field (e.g., "CU," "AD," "AC" or "SU") which is an abbreviation of an entity class name. The abbreviation "EA" will be used here to mean "the abbreviated form of the entity class name" (Entity-name Abbreviation). By way of example, slot number 1 is shown to contain the two-character abbreviation "CU" (representing the entity name "Customer") in its left column 500a.

For expedience sake, a matrix notation is used here to identify the columns of table 500 with letters, a, b, c, . . . , etc. and the rows with a numeral preceeded by a period. The symbol 500a.1 thus refers to the box in table 500 at column 500a and row 500.1.

As further seen in FIG. 5, the abbreviation "AD" is stored in box 500a.2 to represent the entity name "Address". Box 500a.3 holds the abbreviation "AC" for "Account" and box 500a.4 stores the abbreviation "SU" for "Supplier". The slot or row numbers, .1, .2, .3 and .4 of table 500 do not occupy storage space within memory means 130-RP. They merely represent the physical or logical address of their respective rows, 500.1, 500.2, 500.3 and 500.4.

In the corresponding right column 500b of the ENT.DEF table 500 there is stored, for each slot (.1, .2, .3, .4, etc.) the name of a single other table where instances of the named entity class are stored. The abbreviation "EiT" (Entity-instances-Table) will be used here to mean the table where instances of the entity class are stored. Again by way of example, box 500b.1 is shown to reference an EiT called "T.Companies" as the single table where instances of the entity class "Customer" are stored. The entry in box 500b.2 is "T.Addresses" and the entry in box 500b.3 is "T.Accounts". Note that the entry in box 500b.4 is "T.Companies" just as it is for box 500b.1. Instances belonging to two different entity classes (e.g., "CU" and "SU") may be stored in one instances table (EiT) under situations where the data structures of the instances are compatible to the structure of that EiT (e.g., the entity instances table has enough columns of appropriate widths to support the descriptions of each entity instance).

Each entity class can be referenced not only by its abbreviated name (e.g., EA="AD") but also by the slot number (e.g., slot .2) where it is stored in the entity definition table 500. The slot number may function as an "entity type number" (abbreviated here as ETN) for numerically identifying its corresponding entity class. Alternatively, an additional "type number" column (not shown) may be added to the ENT.DEF table, 500, unique type numbers may then be entered into each row of the type number column and these can serve as the ETN's. Thus, the "Address" entity class may be referenced not only by the abbreviation EA="AD" but also by an entity type number whose value, ETN=2. For the relative table organization (RTO) shown in FIG. 5, the ETN happens to be the same as the slot number (e.g. slot 500.2) where the entity name abbreviation (e.g., AD) is stored in the ENT.DEF table together with the name of the corresponding EiT (e.g., T. Addresses). For the case where an additional type number column (not shown) is added, the unique ETN's can be assigned arbitrarily such as according to the alphabetic ordering of the EA's in which case the ETN's may be used as sort keys for alphabetically ordering the ENT.DEF table rows according to entity class names (e.g. using threaded-list techniques).

Referring next to FIG. 6, there is shown another table 600 which is also stored within the data storage area 130-RP of an engine according to the invention. This table 600 may also have a relative-table organization (RTO) and it is referred to as a relations-definition table, or REL.DEF table 600 for short. As before, a matrix notation is used here to identify vertical columns of the REL.DEF table as 600a, 600b, 600c, etc.; horizontal rows as 600.1, 600.2, 600.3, etc.; and individual boxes as 600a.1, 600a.2, 600b.1, 600b.2, etc.

The left-most column 600a holds a two character abbreviation representing the class name and/or meaning-string of a relation bubble. The mnemonic, RA, will be used here to designate such a relationship abbreviation. By way of example, box 600a.1 holds the abbreviation "-BU-" which represents the meaning-string "'s Business". (Hyphens embrace the relation abbreviations here to distinguish them from entity abbreviations [EA's].) Box number 600a.2 stores the abbreviation "-OW-" to represent the meaning-string "'s Owning". Box number 600a.3 stores the abbreviation "-SM-" to represent the meaning-string "'s Statement Mailing". Box number 600a.4 holds the abbreviation "-HQ-" to represent the meaning-string "'s Main Headquarters".

Each row of the REL.DEF table 600 may also identified numerically by a "relationship type number" (RTN) which in the illustrated example happens to be the same as the slot number (.1, .2, .3, etc.) where its corresponding two character code (-BU-, -OW-, -SM-, etc.) is stored. Alternatively, a type number column (not shown) may be added to the REL.DEF table 600 and unique RTN's may be assigned according to any desired, unique number generating scheme, such as according the alphabetic ordering of the RA's. In the latter case, the RTN's can also function as sort keys for ordering the rows of the REL.DEF table (using threaded list techniques) alphabetically according to relationship class names (RA's). Thus, when given a specific RTN, one can quickly calculate the physical or sequence to the logical address in the REL.DEF table 600 where details about the corresponding relation class are stored so as to quickly retrieve those details.

In the second column 600b of the REL.DEF table, there is stored, for each slot (.1, .2, .3, etc.), the name of a single table where instances of the named relation class are stored. The mnemonic, "RiT" (Relation instances Table), is used here to represent such a table. By way of example, the entries in boxes 600b.1, 600b.2, 600b.3 and 600b.4 are respectively: "T.Rel-1", "T.Rel-2", "T.Rel-3" and "T.Rel-1". Note that the entries of box numbers 600b.1 and 600b.4 are the same. Compatible instances of two different relation classes may be represented by two corresponding rows of data stored in a common relation-instances holding table (RiT).

The third column 600c of the REL.DEF table stores the type number ($ETN_h$) of a head entity (E-h). Here, the entity type number ($ETN_h$) is the same as an ETN assigned to a corresponding row in the ENT.DEF table 500 where the abbreviated class name (EA) of that head entity bubble is stored. Similarly, the fourth column 600d of the REL.DEF table stores the type number ($ETN_{t1}$) of a corresponding first tail entity (E-t1).

Figure 6A:
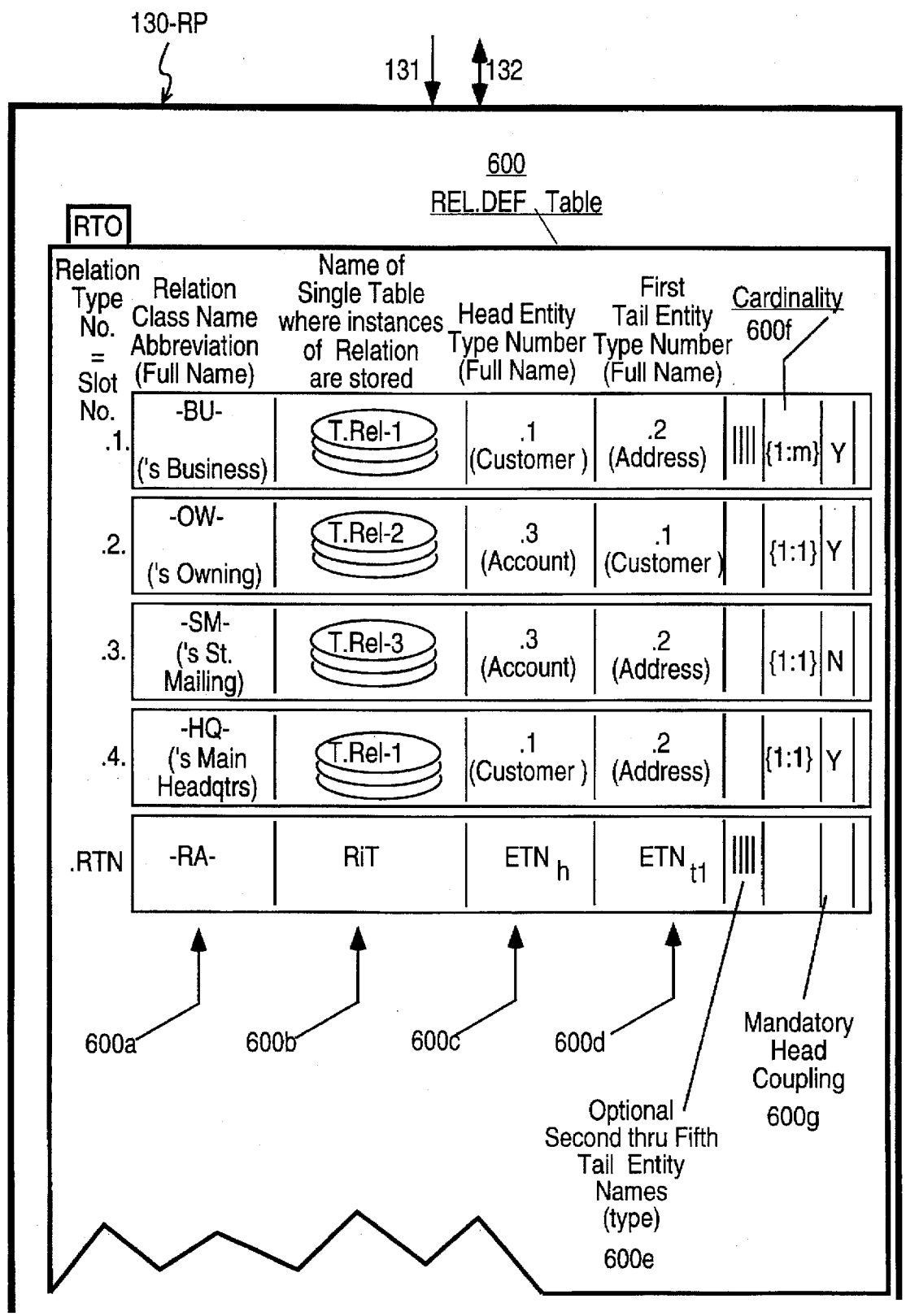

Note that the first three rows (600.1, 600.2 and 600.3) in FIG. 6A correspond to the relations schema shown in FIG. 4A. When row number 600.1 is read across using the column sequence: c, a, d, it corresponds to the relationship descriptor phrase "Customers' business Address". Box 600b.2 tells us that instances of this relationship are stored in an RiT table called "T.Rel-1".

Similarly, row number 600.2, columns c, a, d correspond to the relationship descriptor phrase "Account's owning Customer". Box 600b.2 tells us that instances of this relation are stored in table T.Rel-2. Row number 600.3 likewise corresponds to the relationship describing phrase "Account's statement mailing Address" and tells us that instances of this relation are found in the T.Rel-3 table.

The REL.DEF table 600 can be updated indefinitely by adding new rows to its bottom so as to encompass a great number of further relation classes. There is no need to physically order the data describing each of the relational classes and thus descriptions of new classes can be added to the bottom or other empty slots of the REL.DEF table 600 sporadically as the need arises over time. Relation classes which become obsolete can be deleted to leave behind an empty slot. Similarly, there is no need to order the entity classes defined by the ENT.DEF table 500. The ENT.DEF table can be updated by arbitrarily adding new entity class describing rows to its bottom or other empty slots or by deleting obsolete entries as the need arises. Accordingly, when demands on the database system of the invention change over time, new relation classes may be defined in combination with new head and tail entity classes. The schema of the invention can be continuously restructured as the need arises simply by updating the REL.DEF and ENT.DEF tables, 600 and 500.

The fifth columnar region 600e of FIG. 6A represents a plurality of additional columns within the REL.DEF table 600. The names of multiple tail entities which are activated in addition to or in substitution for the first $ETN_t$ of column 600d may be optionally entered in this region 600e. Referring briefly to FIG. 6B, an exploded view of this fifth region 600e is illustrated. In the example, each relation class R-x can have as many as five tail entities (T1, T2, T3, T4, T5). The invention is, of course, not limited to five. Column 600d identifies the first tail entity, T1, while extension columns 602 through 605 in region 600e identify the optional, other tail entities, T2–T5. The opening phrase "Customer's business . . . " of slot number 600.1 columns, c and a, may apply to the first tail entity T1="Address" and/or to a second tail entity T2="Supplier" and/or to a third tail entity T3="Area", etc.

Extension region 600e is shown to include a tail activating column 606 which functions as a mask to activate or deactivate each of the corresponding tail entity columns 600d, 602–605. In the illustrated example, a dark filled circle means that the corresponding tail entity of that slot (row) is active while an unshaded circle means that the respective tail entity is deactivated. As an alternate embodiment, the mask column 606 may be dispensed with and the lack of an ETN entry (or a "null" entry) in a box of columns 602–605 will be regarded as indicating a deactivated tail while the inclusion of an ETN value will be regarded as indication an active tail. When two or more tail entities are activated, the relation bubble takes on a multi-tailed form such as shown in FIG. 4B at R-4. The same meaning-string is applied to the plural tail entity bubbles of the activated tails. Multiple copies of a prespecified row in the REL.DEF table 600 may be added to empty slots within the table 600 in a boiler-plate stamping manner with only the tail activation masks 606 being modified or some ETN entries of columns 602–605 nulled from copy to copy in order to generate a wide variety of different relation classes.

Returning to FIG. 6A, the next column 600f of the REL.DEF table holds a code indicating the cardinality of the corresponding relation bubble (e.g., {1:m} or {1:1}). The next following column 600g contains a one character code indicating whether there is mandatory coupling (MC) between an instance of the head entity and an instance (or instances) of the tail entity (or active tail entities).

Figure 7A:
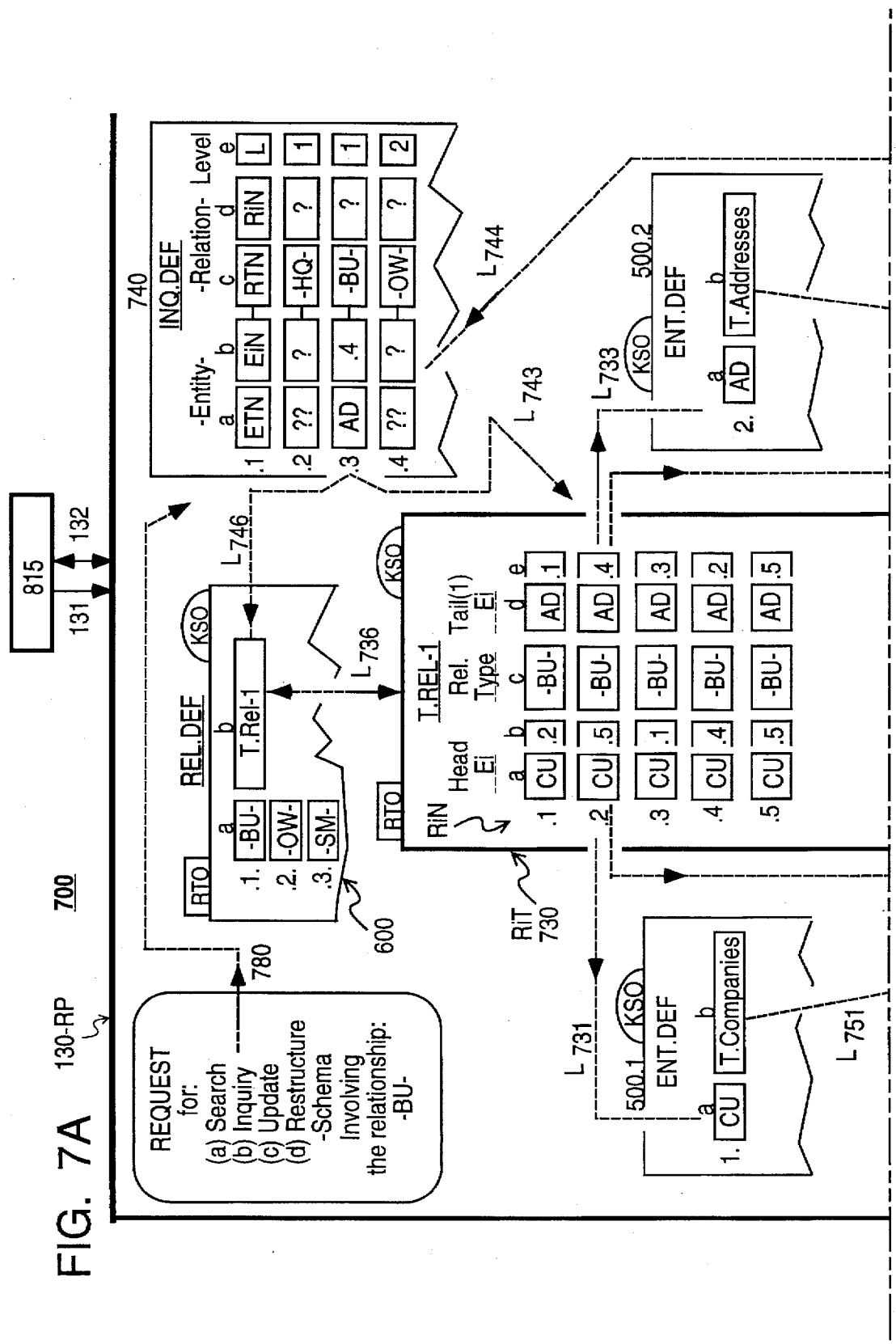
FIG. 7 is a connection diagram showing how relations may be explicitly defined in a Relation-instances Table (RiT) so that unique relations between instances of a first entity class and instances of a second entity class can be identified.
Figure 7B:
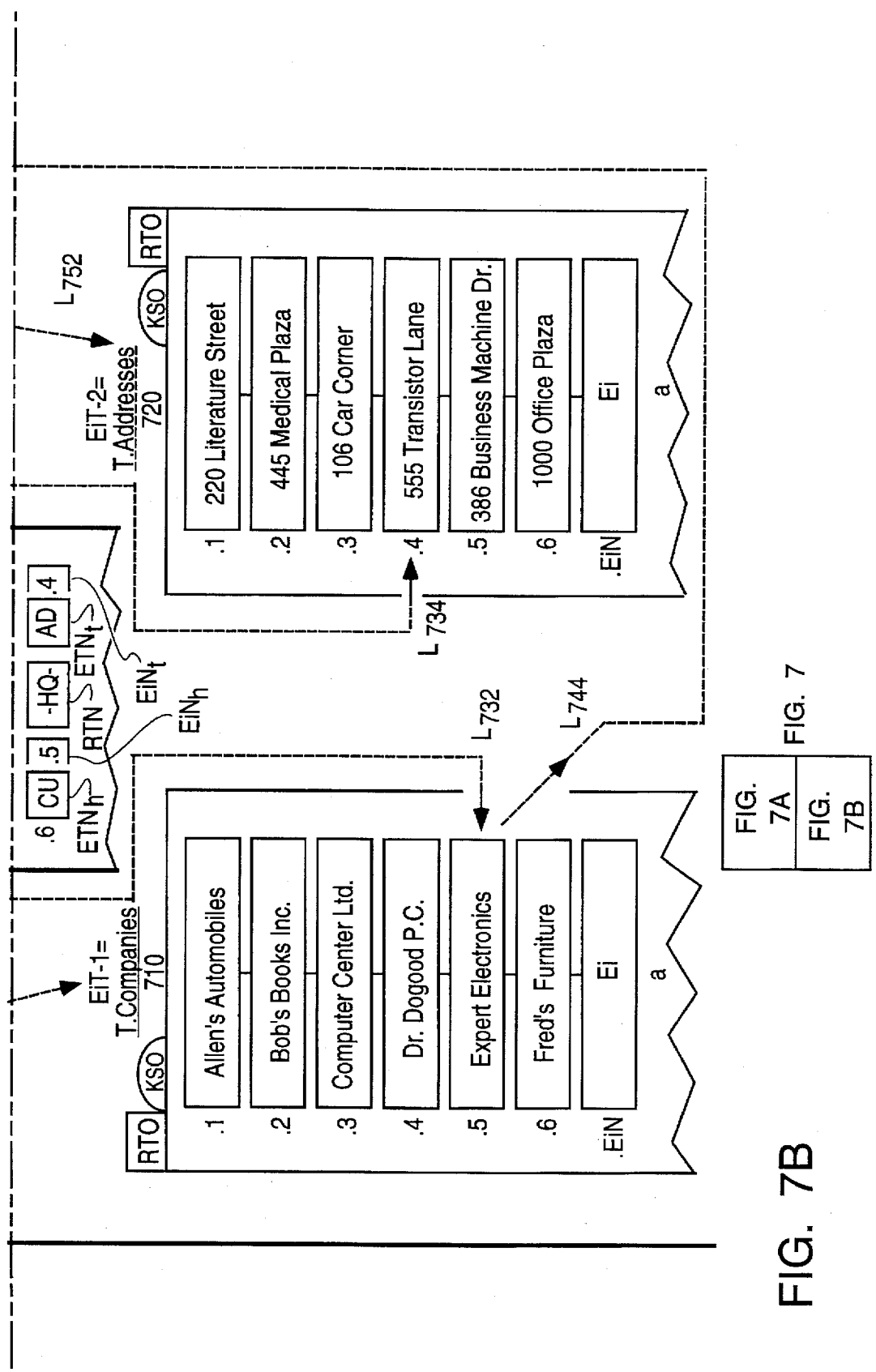

Referring to FIG. 7 a broader view 700 of a relations-processing storage area 130-RP in accordance with the invention is now shown. Storage means 130-RP is coupled to a data search-and-retrieval machine 815 by way of address bus 131 and data bus 132. Starting at the bottom of FIG. 7, we see that two relative-organized (RTO) tables are shown: a T.Companies table 710 and T.Addresses table 720. Both of these are Entity-instance Tables (EiT-1 and EiT-2, respectively). The T.Companies table 710 has one column 710a in whose numbered slots (710a.1, 710a.2, 710a.3, etc.) are stored the names of various companies. The T.Addresses table 720 has one column 720a in whose slots (720a.1, 720a.2, 720a.3, etc.) there are stored data fields representing various street addresses. Each piece of "real" data such as the name of a company (e.g., "Allen's Automobiles") is referred to as an "Entity-instance" or Ei for short. The slot number where the Ei is stored defines an "Entity-instance Number" or EiN for short.

The broader view 700 reveals a third table 730 which is labeled in FIG. 7 as the T.Rel-1 table and also as RiT 730. Each of the numbered slots, 730.1, 730.2, . . . , 730.6, etc., in this "Relation-instances Table" (RiT) 730 has five columnar entries. They are respectively: (a) a head entity-type identifier [ETN$_h$], (b) a head-entity instance identifier [EiN$_h$], (c) a relationship class identifier [RTN], (d) a first tail entity-type identifier [ETN$_t$] and (e) a first tail-entity instance identifier [EiN$_t$]. For the sake of illustrative clarity two-character abbreviation identifiers are shown entered in the vertical columns 730a, 730c and 730d of the T.REL-1 table 730. It is within the contemplation of the invention to alternatively enter the corresponding entity or relation type number (ETN or RTN) for these two-character abbreviations. This allows the retrieval machine 815 to quickly and directly access the corresponding row of the ENT.DEF or REL.DEF table where data of interest is stored using either relative-table or key-sequenced access techniques.

Columns 730a and 730b in combination identify particular instances of a head entity class (Head Ei) while columns 730d and 730e in combination identify particular instances of a tail entity class (Tail Ei). Referring specifically to box number 730a.2 of the T.REL-1 table 730, the "CU" (or alternatively ETN$_h$=.1) entry of this box directs the data retrieval machine 815 of the invention to a first section 500.1 of the ENT.DEF table where there is stored the name of a first table (EiT-1 ="T.Companies") where instances of this named entity class ("CU") are stored. The logical link from third table (RiT) 730 to table area 500.a is labeled as $L_{731}$. The link from table area 500.1 to the first table (EiT-1) 710 is labeled as $L_{751}$.

The second column 730b of the T.REL-1 table holds the slot number or "Entity-instance Number" (EiN=.5 of box 730b.2 for example) of the indirectly referenced Entity-instances table (T.Companies 710) within which a specific instance (Ei="Expert Electronics") of the named head entity class (EA="CU") is stored. In this example, box number 710a.5 of the first EiT 710 contains the name "Expert Electronics" and this name-string is the entity instance referenced by the "CU.5" entries of boxes 730a.2 and 730b.2. The link from box 730b.2 to box 710a.5 is labeled as logical link $L_{732}$.

Referring to columns 730d and 730e of slot number 730.2, a similar linkage is created to the instance of a tail entity class. In the illustrated example, the "AD" entry of box 730d.2 points to a second section 500.2 of the ENT.DEF table (thereby defining link $L_{733}$) where a second pointer is found to a second Entity-instances Table (EiT-2) which in this example is the T.Addresses table 720 (thereby defining link $L_{752}$). Box 730e.2 holds the slot number (.4) of the indirectly referenced table 720 in which the target data "555 Transistor Lane" is stored (thereby defining link $L_{734}$). Thus, the illustrated Relationship-instances Table (RiT) 730 defines a connecting relationship (extending from the arrowhead of $L_{732}$ to row 730.2 to the arrowhead of $L_{734}$) which joins the instance "Expert Electronics" of entity class "Customer" (CU) with the instance "555 Transistor Lane" of the "Address" (AD) entity class. Each row of the RiT 730 is referred to as a "Relation-instance" (abbreviated as Ri) and the slot number of that row defines a corresponding "Relation-instance Number" (RiN). (while not shown, it is within the contemplation of the invention to add a "instance number" column to any of tables 710, 720 or 730 so as to uniquely identify their rows by arbitrarily assigned instance numbers, EiN or RiN, rather than relying on an RTO slot number, but the RTO slot number approach is believed to result in faster data access.) Columns 730a–730b accordingly define the head portion of a "Relation-instance" (Ri) and columns 730d–730e define a tail portion of the relations-instance (as conceptually shown in FIG. 4A). Column 730c, as will now be seen, defines the body portion of each Relation-instance (Ri).

Referring to the middle column, 730c, of the T.REL-1 table 730, this column holds an identifier pointing to a corresponding row in the REL.DEF table 600 where the relationship class of the instant relationship (Ri) is defined. For the sake of illustrative clarity, the RA of each relation class is shown entered in column 730c. It is within the contemplation of the invention to alternatively enter the corresponding slot number, RTN, of the REL.DEF table 600 so as to speed the access time of the retrieval machine 815. By way of example, the entry "-BU-" in box 730c.2 indicates that the relationship between the head instance, Customer.5, and the tail instance, Address.4, is the "'s Business" meaning-string associated with slot 600.1 of the REL.DEF table (FIG. 6).

The relation instances table, T.REL-1 730, may contain many rows, each of which has the identical head entity-instance entries (in col.s 730a and 730b), identical tail entity-instance entries (in col.s 730d and 730e), but different relationship-defining entries (e.g., -BU-, -HQ-, -OW-, etc.) in column 730c. Each of these almost identical rows would represent a different Relation-instance (Ri). As an example, the address instance AD.4 might be the "Business" address of customer instance CU.5 as shown in slot 730.2. But it may also be the headquarters address "-HQ-" of that same customer CU.5 as shown in slot 730.6. Each of these is considered a different relation instance (Ri). The T.REL-1 table 730 is accordingly shown to include two separate row entries: 730.2=CU.5-BU-AD.4 and 730.6=CU.5-HQ-AD.4. A relational query which asks the question, "What is the headquarters address of my customer, Expert Electronics?" would be answered by accessing row 730.6 of the T.REL-1 table 730. The slightly different relational query, "What are all the business addresses of my customer, Expert Electronics?" would be answered by accessing all rows in the T.REL-1 table 730 beginning with the entries, "CU.5-BU-", which in the illustrated case includes rows 730.2 and 730.5.

With the illustrated structuring of a Relation-instances Table (RiT 730), all sorts of relational inquiries can be answered by starting with a known first instance of a first entity class, irrespective of whether the class is a head entity class or tail entity class, and searching through the RiT 730 to locate all relationship-instances (Ri's) of which that starting instance is a member. Once the matching Ri rows are found within a designated Relation-instances Table (RiT), it becomes a simple matter to scan horizontally across the row from the starting instance through the relation descriptor of column 730c to find the corresponding, but until now, unknown instances of the opposed tail and head entity classes.

The uncovered instances can then serve as stepping stones for answering further parts of a compound query. Consider for example the two-level query, "What are all the business addresses of my customer Expert Electronics, and once you know that, what other customers use those addresses as their business addresses?" There may be a plurality of business addresses satisfying the first part (Level-1) of the question and each such answer would serve as a new stepping stone leading to the answers which satisfy the second part (Level-2) of the question.

In accordance with the invention compound queries are answered by defining one or more question lines in an inquiry-definition (INQ.DEF) table 740. Each question line is identified as belonging to either a one level question or to a particular level of a compound question. A first column 740a of the INQ.DEF table is provided for holding the entity type numbers (ETN) of one or more entity classes, regardless of whether they are known at the start of a query. A second column 740b of the INQ.DEF table is provided for holding corresponding instance-identification numbers (EiN), again regardless of whether they are known at the start of a query. A third column 740c is provided for holding one or more relation type numbers (RTN) while a fourth column 740d is provided for holding corresponding relation-instance numbers (RiN), some of which may be known and others not known at the start of a query. Fifth column 740e defines the level of each question row relative to preceding question rows.

An RTN value, which if known, is entered in a box of third column 740c in order to indicate to the retrieval machine 815 a corresponding row in the REL.DEF table 600 from which the retrieval machine 815 can obtain the name of the single table (RiT-x) where all instances of the named relation type (RTN) reside. The identified table, RiT-x, can then be searched for one or more Ri rows which hold information relevant to a posed query. When found, the RiN values of those rows are entered into one or more boxes of fourth column 740d. The specific Ri rows (e.g., row 730.2) which are fully specified by filled in RTN-RiN data pairs of the INQ.DEF table 740 can then be accessed to direct the retrieval machine 815 to the corresponding head and tail entity instances of interest (e.g., the CU.5 and AD.4) instances which are related to one another by the -BU- entry of box 730c.2).

If a specific Ri row is not fully identified at the beginning of a query within a row of the INQ.DEF table 740 by a completed RTN-RiN pair, the Ri row or rows of interest can be nonetheless located by partially filling in a row within the INQ.DEF table 740 and then searching the REL.DEF or ENT.DEF tables for additional information. Row 740.2 of the INQ.DEF table is shown to have the question line, "??.?-HQ-?" which may mean "Please identify the Headquarter addresses of all my customers". In such a case, all rows of the T.REL-1 table 730 which have the entry -HQ- in their middle column 730c would provide the required information. Each such -HQ- row of RiT 730 would pair an identified instance of a Customer (head Ei) with an identified instance of a headquarters Address (Tail(1) Ei). It is to be appreciated that for cases of multi-tailed relation classes, the corresponding RiT would have columns for identifying the other tail entity instances (e.g. Tail(2) Ei, Tail(3) Ei, etc., not shown).

Sometimes a question is more specific. By way of example, let it be assumed that an inquiring user has a specific but fragmentary piece of starting information such as the street address "555 Transistor Lane". The inquiring user wishes to find out the names of one or more companies for whom "555 Transistor Lane" is a "Business Address". The user identifies the fragmentary information to the data retrieval machine 815 as belonging to the "Address" entity class. In response, the machine 815 searches through the ENT.DEF table 500 to locate the entity type number "ETN" of the named class and the Entity-instances Table "EiT" where all instances of this "Address" entity class are stored. It should be recalled that the illustrated relative-table organization "RTO" of the ENT.DEF table 500 is not mutually exclusive of a key-sequenced organization "KSO". According to the invention, the EA column 500a of the ENT.DEF table is threaded alphabetically so that the row of a desired entity class (e.g., EA ="AD") can be easily found using known key-sequenced search algorithms. A different table (not shown) can serve as an abbreviation to full name look-up table for converting between the entity name abbreviation (EA) and the full name or narrative description of the entity class (ECN) if desired or, alternatively, the ENT.DEF table 500 may include one or more additional columns (not shown) for providing this search and conversion function.

Once the corresponding type number (ETN) of the entity class is identified, in this case ETN=.2 referencing slot 500.2, the retrieval machine 815 places this first puzzle piece into an appropriate box of the INQ.DEF table. In this example it will be box 740a.3 of INQ.DEF question line 740.3 which is for illustrative purposes filled with the corresponding EA="AD".

The retrieval machine 815 then obtains from box 500b.2 of the ENT.DEF table the name of the corresponding EiT where it is to search for the occurrence of the fragmentary information "555 Transistor Lane". The EiT's can be key-sequence organized (KSO) in addition to their RTO structuring to facilitate such searching. After the corresponding EiT (in this case, the T.Addresses table 720) is searched and the row of the fragmentary information is found, its corresponding EiN, in this case .4, is entered as an entity-instance number (EiN) in box 740b.3 of the INQ.DEF table 740.

The earlier found entity type number (ETN) which corresponds to EA="AD" now combines with the EiN=.4 of INQ.DEF row 740.3 to define the "starting instance" for resolving question line 740.3. The starting instance is AD.4.

The relationship type number (RTN) of the relationship under question (-BU-) is entered in box 740c.3. If the RTN value is not known, the REL.DEF table 600 is first searched to generate the appropriate RTN. While not shown, the REL.DEF table or some other table will include a full name or narrative column for converting between a relationship's full name/description and its abbreviated form (RA). Box 740d.3 is now the last puzzle piece to be filled in as indicated by a question mark in FIG. 7.

Since the ETN.EiN-RTN- entries of boxes 740a.3, 740b.3 and 740c.3 are now all known, the retrieval machine 815 searches through the corresponding RiT (T.REL-1 table 730) to locate all relation-instances (Ri's) which have the corresponding ETN plus Ein in the tail entity instances columns 730d and 730e and the corresponding RTN in column 730c. The REL.DEF table 600 identifies the starting entity class of the AD.4-BU-? question as being a tail entity. (When there is more than one tail entity, the RiT will have plural columns for identifying first, second, etc. tail instances and the REL.DEF table 600 will specify which of these tail columns is to be searched.) In the illustrated example, row 730.2 of the T.REL-1 table will be found to have matching information. The retrieval machine 815 can now fill the last empty box 740d.3 of the INQ.DEF row 740.3 with the information RiN=.2. Once question row 740.3 is completely filled, the retrieval machine 815 may use the information of this INQ.DEF row 740.3 to retrieve the detailed information about the head entity instance, Ei="Expert Electronics" from table row 710a.5 of the T.Companies table.

The ETN.EiN identifiers of the uncovered Level-1 answer, "Expert Electronics" can now serve as stepping stones which fuel a second part of a compound query. For example, the full query might have been "Who has business address, 555 Transistor Lane and what bank accounts belong to the entity or entities that satisfy the first part of this question?" The first part is defined here as "Level-1" of the question and the second part as "Level-2". Column 740e of the INQ.DEF table is shown to identify the level number. Referring to a feedback link $L_{744}$ shown in FIG. 7, the Level-1 answer (ECN="CU" and EiN=.5) can now be fed back as an entry to a subsequent inquiry-defining row 740.4 so that the multi-level inquiry path may continue. Inquiry box 740c.4 is shown already filled with the relationship identifier (-OW-) for locating account owners. The answer to inquiry row 740.4 may be used to fuel yet a further level (Level-3, not shown) of a compound inquiry and the answer or answers to that inquiry may fuel yet further inquiry rows.

Figure 8:
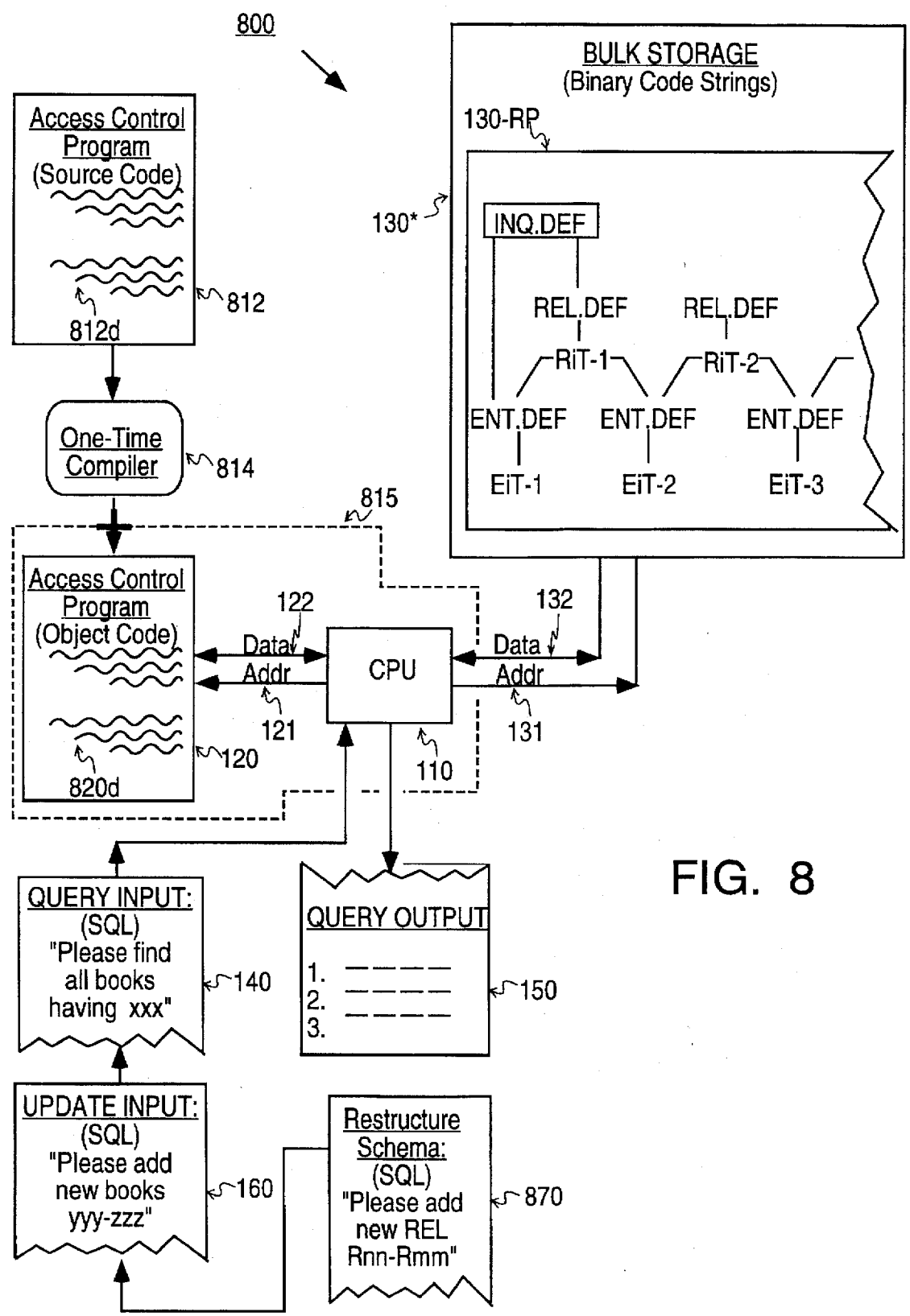
FIG. 8 is a block diagram of a database system according to the invention.

Referring to FIG. 8, a block diagram of a database system 800 in accordance with the invention is shown. Bulk storage means 130* is indicated to include a relation-processing region 130-RP in accordance with the invention. The bulk storage means 130* may also include previously-utilized relational tables for defining "implied" relationships between entities. Such "implied" relationships are not incompatible with the "explicit" relationships that are defined by the REL.DEF table 600 of the invention. As shown in region 130-RP of FIG. 8, the REL.DEF table and ENT.DEF table may be used to define a continuously expandable backbone which supports various relationships (RiT-1, RiT-2, etc.) between various entity instances (EiT-1, EiT-2, EiT-3, etc.). The INQ.DEF table may be visualized as having two legs (dashed vertical lines) which sequentially step from a starting instance table (EiT-1), across a starting table of relationship instances (RiT-1) to an explicitly linked table which holds relationship-opposed instances (EiT-2) of the starting instances. The opposing instances (of EiT-2) then become starting instances for a next inquiry step over yet a further set of relationship instances (RiT-2).

Since the REL.DEF and ENT.DEF tables may be expanded as desired by adding new entries to empty middle or bottom slots found within them, a lay user can create new entities, new relation classes and restructure the schema of explicitly-defined relationships and entities forever without having to reprogram the database system 800 at the source or object code level. Instead, the lay user supplies schema restructuring commands, in an appropriate structured language, as indicated at 870 for restructuring the schema whenever needed. The access control program 820d of the retrieval machine 815 may remain fixed while the entity-to-explicit-relationship schema of region 130-RP is forever changed. Accordingly, object-code compilation 814 needs to occur only once. The source code listing 812 of this access control program needs to be developed and debugged only once. Substantial cost savings are realized, especially as time progresses and new entity-relationship schemes are required.

In some commercial applications, the ENT.DEF table and REL.DEF table may be relatively short, having for example less than 1000 rows each (e.g., the ENT.DEF table may have 30 rows or less and the REL.DEF table may have approximately 100 rows or less). For such cases it has been found advantageous to "copy" the ENT.DEF and REL.DEF tables from the bulk storage means 130* to a higher speed memory area within first memory means 120 in order to shorten processing time. The copied versions of the ENT.DEF and REL.DEF tables can be purely-key-sequenced if an additional "type number" column is added for storing the respective ETN's and RTN's of each row. The higher data access speed of the first memory means 120 more than compensates for any speed reduction which might be caused by switching to a purely key-sequenced organization. These "mirror" copies of the ENT.DEF and REL.DEF tables are then accessed by the CPU 110 in place of the original ENT.DEF and REL.DEF tables. It is advisable to periodically check the original ENT.DEF and REL.DEF tables for possible revisions, since lay users may update that original tables at any time, and when such revisions are detected, to immediately recopy the ENT.DEF and REL.DEF tables into the first memory means 120 so that the mirror tables faithfully reproduce the contents of the original tables.

The CPU 110 in combination with the various modules of the object code 820d can be visualized as one or more machine means for performing data-altering functions as specified by the object code 820d. A Microfiche Appendix is included here listing sample modules written in Tandem COBOL'85™ and TANDEM SCREEN COBOL™ for execution on a Tandem NONSTOP™ computer system running under Tandem NonSTOP SQL™, TMF™, Pathway™, SCOBOLX™ and Guardian™ systems (all available from Tandem Computers of Cupertino, Calif.). It is to be understood that the sample modules disclosed in the Microfiche Appendix are merely exemplary. The invention may be practiced using different computer hardware and/or software.

Figures 9, 9B:
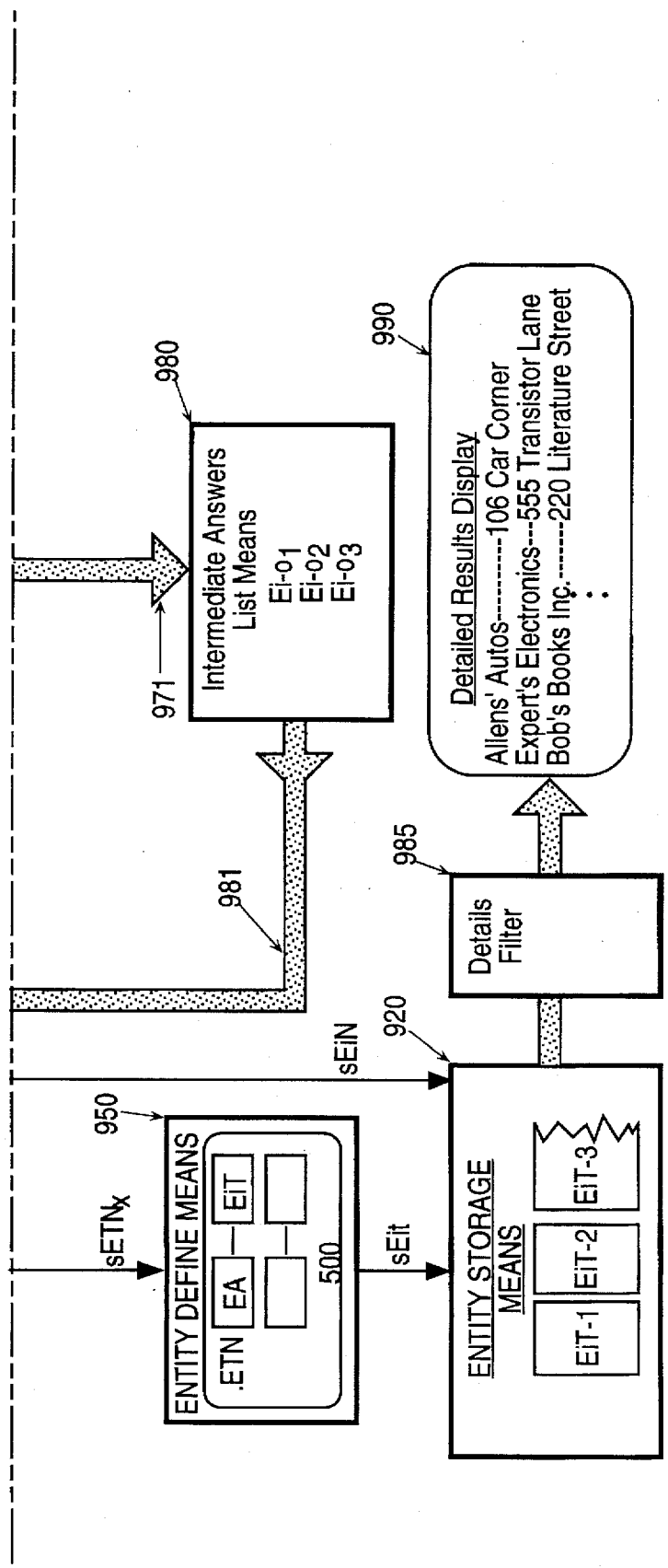
FIG. 9 is a block diagram of a relations processing engine according to the invention.

Referring to FIG. 9, a schematic diagram of an inquiry processing engine 900 in accordance with the invention is shown. The engine 900 comprises an inquiry guide means 910 which is coupled to a relationship defining means 960, a relationship storage and search means 970 and to an intermediate-answers receiving means 980. The intermediate answers means 980 feeds abbreviated answers back to the inquiry guide means 910 after such answers are produced by the relation storage means 970. Desired ones of all produced results are sent from the inquiry guide means 910 to an abbreviated results gathering means 915 which then expands them into full result details by sending an entity type signal $sETN_x$ to an Entity Define means 950 which includes within itself, the earlier described ENT.DEF table 500. The $sETN_x$ signal is converted by the entity define means 950 into an entity table selecting signal sEiT which is fed into an entity storage means 920 that includes within itself a plurality of entity-instances tables (EiT-1, EiT-2, etc.) such as earlier described. Results gathering means 915 also feeds an instance row selecting signal, sEiN, to entity storage means 920. Details from the addressed entity instance row are then transmitted through a details filter 985 and portions of the details which are selected by the filter 985 are then printed on a detailed results display (e.g. a video monitor) 990.

Relationship inquiry in general is a two step operation: path selection (to create an Inquiry) and inquiry execution. On a Path Selection screen (not shown) the operator selects starting and optionally ending entity types and supplies detailed description of the path to follow. Each path is defined in terms of:

a starting entity type to initiate the query path, a connecting relationship type which will lead to an intermediate entity type and then to another connecting relationship type and another intermediate entity type, and so forth until a last connecting relationship type leads to a terminating entity type Taking out all but the key words from the above, we get the form structure:

<starting entity type>
    <connecting relationship type> <intermediate entity type>
    <connecting relationship type> <intermediate entity type>
    . . .
    <connecting relationship type> <terminating entity type>

A single inquiry definition may initiate several parallel paths which extend from a starting entity type to an ending entity type. When the ending entity type has not been specified in the header of the path-selecting screen then all these parallel paths can end with different entity types. For example, an inquiry to show a person's total involvement with all accounts held at a bank could be defined as shown in the following Table I:

TABLE I

| Entity | Level-1 Relationship | Connected Entity | Level-2 Relationship | Connected Entity |
| --- | --- | --- | --- | --- |
| Person | ---> Account Holder | --> Account | | |
| Person | ---> Loan Guarantor | --> Account | | |
| Person | ---> Signatory | --> Account | | |
| Person | ---> Card Holder | --> Account | | |
| Person | ---> Group Member | --> Joint Party | ---> Account Holder | --> Account |
| Person | ---> Group Member | --> Joint Party | ---> Card Holder | --> Account |

Each of the above lines is a separate path generated by one inquiry form. The results of the inquiry would show all Accounts a Person had influence over, either directly or as a member of a partnership.

For simplicity the above inquiry is shown on the screen as in the following Table II:

TABLE II

| Level | Relationship | Entity |
| --- | --- | --- |
| 1 | Account Holder | Account |
| 1 | Loan Guarantor | Account |
| 1 | Signatory | Account |
| 1 | Card Holder | Card |
| 1 | Group Member | Joint Party |
| 2 | Account Holder | Account |
| 2 | Card Holder | Card |

Note that level numbers are used to determine which entity types are intermediate to a path, which entity types terminate a path, and which relationship types commence a new parallel path. A line containing a level number which is the same as that of an immediately previous line indicates a parallel path separate from the previous line. A level number greater than that on the previous line indicates the entity on the previous line is an intermediate entity (i.e. the path is an association, and will follow several relationship links before terminating the path.)

Once a set of paths have been stored as an inquiry and recorded in the system it may be executed. Each unique set of inquiries is given a unique name, stored as such in the inquiry-definition table (INQ.DEF) and may be recalled for execution repeatedly at any time without need to go through the path selection process again. Before executing the predefined inquiry, the operator must select one or more starting entity instances for which the query is to run. Hence for each execution of an inquiry, the operator must choose which occurrence of the Starting Entity Type to use. Using the previous sample inquiry to investigate persons of the names, "John Smith" and "Bill Brown", the operator would execute the same inquiry once using "John Smith" as the Starting Entity instance and once using "Bill Brown" as the Starting Entity instance.

The Inquiry is executed by examining each of the defined paths in turn. Starting with the selected entity and following the first relationship, a list of intermediate (or target) entities is assembled. For each of the intermediate entities the next leg of the path is followed through the level 2 relationship etc. until the inquiry operation arrives at the ending entity type at which time the results of the entire path (with all intermediate entities and relationships) may be displayed to the operator.

If the ending entity type has been specified during inquiry definition, then at execution time the operator may select not only the starting entity occurrence of interest but also the occurrence of an ending entity. In this case the inquiry will return results from only the paths that satisfy this termination condition.

Reusable inquiry sets would normally only be created by privileged users. However, each inquiry set that is created for subsequent executions may be given its own security settings and attached to its own menu. Hence where sensitive data was involved, normal operators would be given access to only those inquiry sets they specifically need for their day to day business operations.

Despite its complexity, the inquiry engine 900 of the invention can operate at high speed because the EiT and RiT structures, while they may be large in size rely on relative tables. Relative table structures have always offered high performance for Random memory access (as opposed to key-sequenced access) but presented many complications and difficulties in other areas of use (e.g. updating). Because of this, conventional wisdom has been to use purely Key-Sequenced structures almost exclusively. Key-Sequenced structures pay performance penalties for the use of extra indexing levels.

The first problem with Relative structures was that with some early versions, deleted row locations (or slots) could not be re-used without file (table) reorganization. Reorganization of Relative structures in this case meant compressing the file (table) to regain unused slots. This process can change the relative addresses from their original values, which can cause corruption of the database. Reorganization is no longer required because Relative structures such as offered in Tandem's NonSTOP SQL™ system allow deleted row slots to be reused immediately. The Tandem system actually ensures that vacated slots are used again and again. Relative tables in NonSTOP SQL™ can be partitioned and re-partitioned without risk of corrupting the database, but table compression is no longer necessary or allowed. Partitioning a table means that the table can be split across a plurality of data storage devices, usually disks, transparent to the object code of the application program running under NonSTOP SQL™.

The second problem with Relative structures was implementing meaningful keys that allowed access to the data in a sequence based on indicative data, such as numerical order of account number or alphabetical order of customer name. However, by using Alternate Key index tables it is possible to provide meaningful sequential access of entities stored within Relative Tables.

The Relationships Processor or "engine" of the present invention is a "Closed Loop" system in that all explicit schema definitions are stored within the system. The finite set of tables and their meanings are also defined within the system. This provides an infrastructure that makes the Table Structures transparent to users and developers. Hence, Relative tables can be used for performance improvements while avoiding any usability penalties that once existed.

Hence this invention has gone against conventional attitudes because of new data processing techniques used by the invention.

The above advances in Relative structure techniques, coupled with the closed loop nature of the Relationships Processor has allowed Relative tables to be used in a controlled and meaningful way, destroying the premise that Key-Sequenced structures are the best way to store relationships.

A benchmark was run on a Tandem NonSTOP SQL™ system to test the system's performance capabilities. The benchmark was to simulate the normal processing requirements of an extremely large bank's Customer Information System.

The database used 14 Gigabytes of disk storage space, and was populated with 5 million Customers, 7 million Cards, 9 million Addresses, 10 million Accounts and 67 million relationships.

The benchmark simulated 1000 simultaneous users (tellers), with each user executing 100 typical on-line transactions.

The invented system achieved a rate of 64 transactions per second with less than 2.6 second response time for 90% of all transactions which included all screen formatting. This is quite remarkable for a database system of this size and complexity.

The invented system was also benchmarked for batch processing at rates of hundreds of transactions per second. This shows that the system is able to process inquiries at commercially acceptable rates.

Referring to FIG. 9, an inquiry begins by transmitting a signal representing starting entity instance and relation information (e.g., "Level-1=$ETN_1.EiN_1$-$RTN_1$-?") from an input form means 901 to the inquiry guide means 910. The data of this starting instances and relationship signal, 902, is stored in an inquiry-defining table 740 provided within the inquiry guide means 910. The inquiry guide means 910 transmits a starting relationship type signal $sRTN_1$ to the relation defining means 960 and a relationship instance defining signal $sRi=ETN_1$ and/or $EiN_1$ and/or $RTN_1$ to the relationship storage and search means 970. The relation defining means 960, which includes REL.DEF table 600, transmits a Relation-instances table selecting signal $sRiT_1$ to the relationship storage means 970 in order to select one of a plurality of Relation-instances tables, $RiT_1$, $RiT_2$, $RiT_3$, etc. stored within the relation storage means 970. The relation defining means 960 further transmits a head or tail identifying signal, H/T, to the relation storage means 970 to identify a head or tail instance defining column, Ei-h or Ei-t, which should be searched for information matching the $ETN_1$ and/or $EiN_1$ information of the starting instance signal, sRi. (While not shown, each RiT can have multiple columns specifying a plurality of tail entity instances, i.e., Ei-t1, Ei-t2, etc. and in such a case, the H/T signal also indicates which one or more tail columns of the target RiT are to be searched for matching information.) In response, the relationship storage and search means 970 searches through the selected relationship instances table RiT-x to find information matching that of the input signals, sRi, sRiT and H/T. Signals 971 representing the opposing entity instances (Ei-o) of each matched row are then transmitted to an intermediate answer gathering means 980 which compiles within its memory area a list of entity instances, Ei-$o_1$, Ei-$o_2$, Ei-$o_3$, etc., which oppose the starting entity instances found in matching rows of the referenced RiT (730). The collected intermediate answers are then fed back along path 981 to the inquiry guide means 910 in order to fill stepping-stone boxes (shown as still open question, ???) in a next level query row (e.g. Lv1-2). The next query row (e.g. Lv1-2) now becomes the new starting row and its contained information, Ei-$o_2$-$RTN_2$-?, is now fed as the new sRi signal to the relation storage means 970 and the relation define means 960. The inquiry loop repeats until an inquiry path terminates on its own or a terminating entity is struck.

After termination, the results of the inquiry loop are fed through signal bus 911 to an abbreviated results compiling means 915 which orders the results according to their level number and interrelation. By way of example, a first Level-2 inquiry may produce intermediate answer, Ei-2*a*. That intermediate answer together with its forward-connecting relation ($RTN_2$) may produce a plurality of intermediate answers at Level-3, namely, Ei-32*a*.1, Ei-32*a*.2, etc. Each of these Level-3 answers may then result in a larger plurality of Level-4 answers (not shown) and so forth. Likewise the Level-2 answer Ei-2*b* may produce a plurality of Level-3 answers, Ei-32b.1, Ei-32b.2, Ei-32b.3, etc. Each of these answers is recorded as a paired set of an entity class number ETN and an entity instance number EiN. The abbreviated results are then expanded into user-understandable results by sending an entity type number signal, sETN$_x$ to the entity definition means 950 and a corresponding entity instance signal, sEiN to the entity storage means 920. In response the entity storage means 920 then produces detailed information from the referenced entity instances tables. Often, the database user may not wish to see all of the detailed information within a row, but rather wishes to see only prespecified columns of the referenced row and wishes the data to be displayed according to a predetermined display format. The details filter 985 filters out information from undesired columns and orders the remaining data according to a predetermined display format selected by the user. The desired "real" information then appears in the selected format on display means 990.

Figure 10:
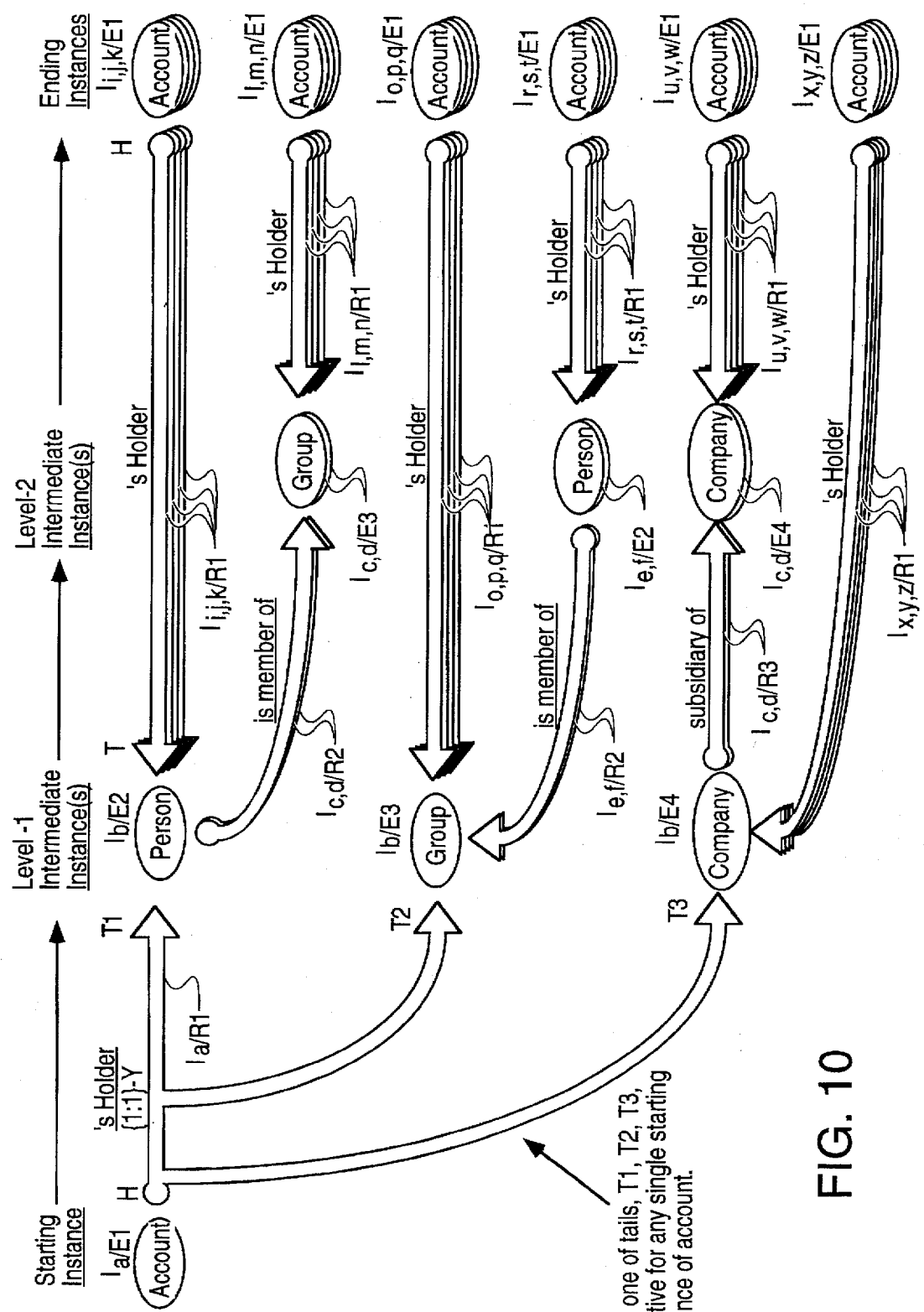
FIG. 10 graphs a variety of sample inquiry paths that may be followed by the engine of FIG. 9.

Referring to FIG. 10, it will now be explained how a single starting instance can lead to the production of a large plurality of answers. A database user has a first account number (instance $I_{a/E1}$) from which the user wishes to find all persons, groups or companies which are holders of that account, and once known, all other accounts held by those persons, groups or companies; and further, where a person is a member of a group or a group has many persons as its members or where a company has subsidiary companies, the accounts held by these entities. As shown in FIG. 10, the relationship instance $I_{a/R1}$, has three tails, T1, T2 and T3, only one of which will be active for a given instance of the head entity $I_{a/E1}$. Tail T1 points to person instance $I_{b/E2}$. Tail T2 points to group instance $I_{b/E3}$. Tail T3 points to company instance $I_{b/E4}$. These instances of person, group and company represent intermediate instances which lead to the desired answer, namely, the accounts held by such persons. One person $I_{b/E2}$, may hold many other accounts as indicated by the multiple instances of the 's Holder relationship instances, $I_{i/R1}$, $I_{j/R1}$, $I_{k/R1}$, etc. Each of these relationship instances has a corresponding account instance at its head (H) end. In FIG. 10, these are $I_{i/E1}$, $I_{j/E1}$, $I_{k/E1}$, etc. The rest of FIG. 10 is self-explanatory. A person can belong to several groups and each of those groups may hold several accounts. A group may have many members and each of those members may have several accounts. A company may be a subsidiary of many other companies and each of those companies can hold several accounts. Thus, the list of ending instances shown in FIG. 10, $I_{i,j,k/E1}$-$I_{x,y,z/E1}$, can be quite long compared to the starting instance $I_{a/E1}$ which started the inquiry.

A variety of modifications will become apparent to those skilled in the art in light of the above description. The scope of the claimed invention is accordingly, defined, not by any specific embodiment described herein, but rather by the following claims.

What is claimed is:

1. In a computer system, a data processing system for maintaining cardinality in a relational database, said data processing system comprising:

memory means containing (i) relation definition table means comprised of at least one relation type record wherein each relation type record defines a relation type and includes cardinality data defining cardinality of said relation type and (ii) relation instance table means comprised of at least one relation instance record, wherein said relation definition table means and said relation instance table means are a part of said relational database;

means, operatively coupled to said relation definition table means and said relation instance table means, for storing a plurality of relation instance records in said relation instance table means, wherein each relation instance record defines a relation of one of said relation types and further wherein said relation is between two entities; and means, operatively coupled to said relation instance record storing means, for detecting a cardinality violation for a first relation type, said means for detecting comprising means for determining whether said relation instance table means contains a first relation instance record, that defines a first relation of said first relation type between a first entity and a second entity; and means for determining whether said relation instance table means contains a second relation instance record that defines a second relation of said first relation type between said first entity and a third entity.

2. The data processing system of claim 1 wherein each relation instance record defines a relation between a head entity and a tail entity; and further wherein said first entity is a head entity and said second and third entities are tail entities.

3. The data processing system of claim 1 wherein each relation instance record defines a relation between a head entity and a tail entity; and further wherein said first entity is a tail entity and said second and third entities are head entities.

4. A computer method for maintaining cardinality in a relational database, said method comprising:

storing in relation definition table means of said relational database a plurality of relation type records wherein each said relation type record defines a relation type and includes cardinality data defining cardinality of said relation type;

storing in relation instance table means of said relational database a plurality of relation instance records wherein each said relation instance record defines a relation of a relation type defined by one of said relation type records and further wherein said relation is between two entities; and detecting a cardinality violation for a first relation type wherein said step of detecting comprises determining whether said relation instance table means contains a first relation instance record defining a first relation of a first relation type between a first entity and a second entity; and determining whether said relation instance table means contains a second relation instance record that defines a second relation of said first relation type between said first entity and a third entity.

5. The method of claim 4 wherein each relation instance record defines a relation between a head entity and a tail entity; and further wherein said first entity is a head entity and said second and third entities are tail entities.

6. The method of claim 4 wherein each relation instance record defines a relation between a head entity and a tail entity; and further wherein said first entity is a tail entity and said second and third entities are head entities.

* * * * *